United States Patent
Park et al.

(10) Patent No.: US 12,069,646 B2
(45) Date of Patent: Aug. 20, 2024

(54) METHOD FOR TRANSMITTING AND RECEIVING UPLINK SIGNAL IN WIRELESS COMMUNICATION SYSTEM, AND APPARATUS THEREFOR

(71) Applicant: LG ELECTRONICS INC., Seoul (KR)

(72) Inventors: Jonghyun Park, Seoul (KR); Jiwon Kang, Seoul (KR); Seongwon Go, Seoul (KR)

(73) Assignee: LG ELECTRONICS INC., Seoul (KR)

(*) Notice: Subject to any disclaimer, the term of this patent is extended or adjusted under 35 U.S.C. 154(b) by 356 days.

(21) Appl. No.: 17/594,817

(22) PCT Filed: May 4, 2020

(86) PCT No.: PCT/KR2020/005878
§ 371 (c)(1),
(2) Date: Oct. 29, 2021

(87) PCT Pub. No.: WO2020/222608
PCT Pub. Date: Nov. 5, 2020

(65) Prior Publication Data
US 2022/0210807 A1   Jun. 30, 2022

(30) Foreign Application Priority Data
May 2, 2019   (KR) .................. 10-2019-0051885

(51) Int. Cl.
*H04W 72/1268*   (2023.01)
*H04L 1/1812*   (2023.01)
(Continued)

(52) U.S. Cl.
CPC ....... *H04W 72/1268* (2013.01); *H04L 1/1812* (2013.01); *H04L 5/0048* (2013.01); *H04W 72/21* (2023.01)

(58) Field of Classification Search
CPC . H04W 72/1268; H04W 72/21; H04W 52/14; H04W 52/42; H04L 1/1812;
(Continued)

(56) References Cited

U.S. PATENT DOCUMENTS

2020/0229104 A1* 7/2020 MolavianJazi ... H04W 72/1268
2020/0314860 A1* 10/2020 Zhou .................. H04W 72/23
(Continued)

FOREIGN PATENT DOCUMENTS

KR   1020190035633   4/2019

OTHER PUBLICATIONS

PCT International Application No. PCT/KR2020/005878, International Search Report dated Aug. 11, 2020, 5 pages.
(Continued)

*Primary Examiner* — Chae S Lee
(74) *Attorney, Agent, or Firm* — LEE, HONG, DEGERMAN, KANG & WAIMEY

(57) ABSTRACT

A method for transmitting an uplink signal by a terminal in a wireless communication system, according to one embodiment of the present specification, includes: receiving configuration information related to a transmission of an uplink signal; receiving a message scheduling the transmission of the uplink signal; and transmitting the uplink signal.

10 Claims, 19 Drawing Sheets

(51) Int. Cl.
  *H04L 5/00*      (2006.01)
  *H04W 72/21*     (2023.01)
(58) Field of Classification Search
  CPC ... H04L 5/0048; H04L 5/0053; H04L 1/1861; H04B 7/0691; H04B 7/0695; H04B 7/0404; H04B 17/373
  See application file for complete search history.

(56) References Cited

U.S. PATENT DOCUMENTS

2021/0167821 A1\* 6/2021 Chen ................ H04B 7/0617
2022/0094500 A1\* 3/2022 Liu ................ H04W 52/325
2022/0386355 A1\* 12/2022 Yi ................ H04W 72/569

OTHER PUBLICATIONS

LG Electronics, "Updated feature lead summary of Enhancements on Multi-beam Operations," R1-1905838, 3GPP TSG RAN WG1 Meeting #96bis, Apr. 2019, 24 pages.
Qualcomm Incorporated, "Multi-TRP Enhancements," R1-1905026, 3GPP TSG-RAN WG1 Meeting #96b, Apr. 2019, 29 pages.
Vivo, "Discussion on multi PDCCH based multi TRP transmission," R1-1900137, 3GPP TSG RAN WG1 Ad-Hoc Meeting 1901, Jan. 2019, 15 pages.
Huawei et al., "Summary of AI: 7.2.8.2. Enhancements on Multi-TRP/Panel Transmission of Offline Discussion," R1-1903541, 3GPP TSG RAN WG1 Meeting #96, Mar. 2019, 59 pages.

\* cited by examiner

[FIG. 1]
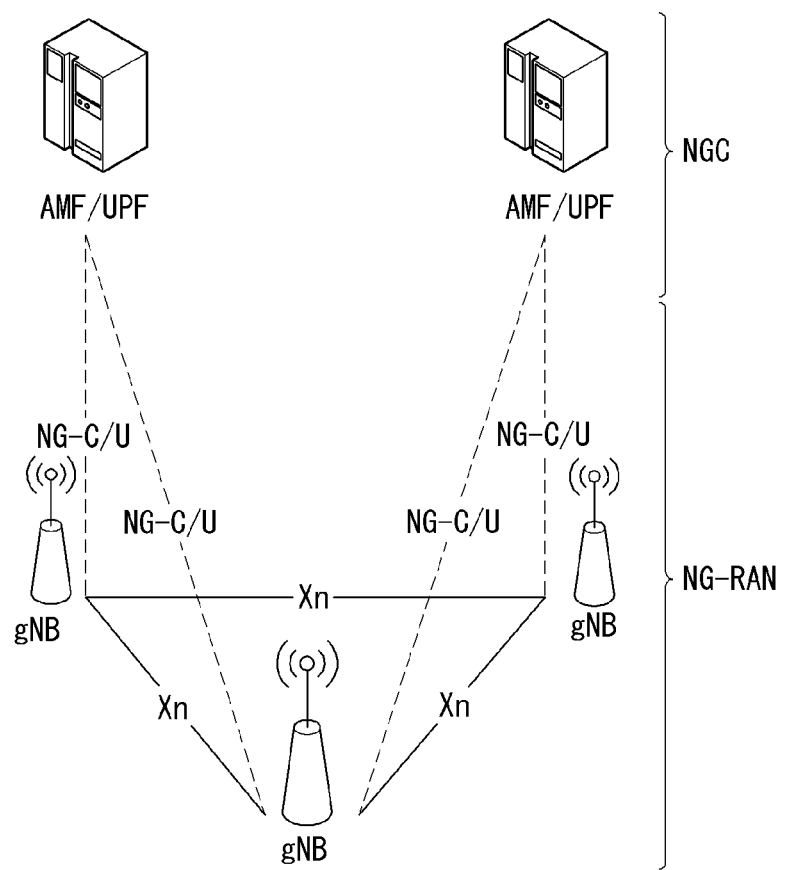

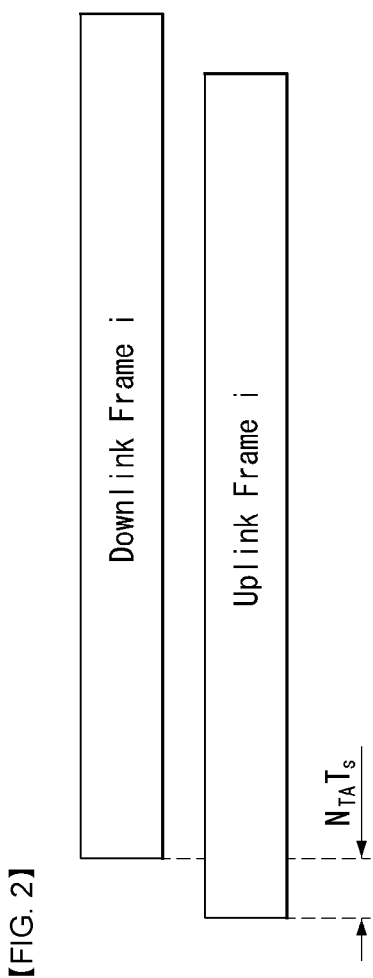
[FIG. 2]

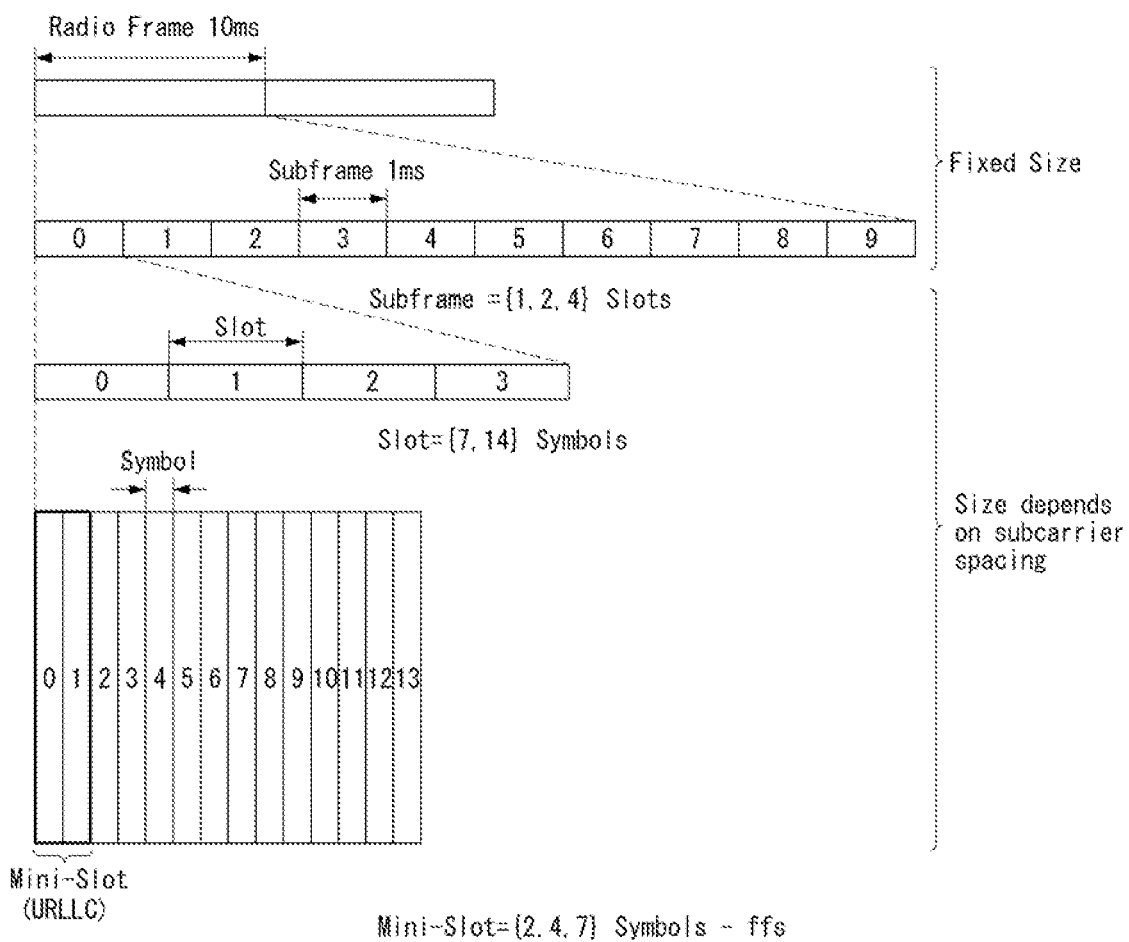

[FIG. 4]
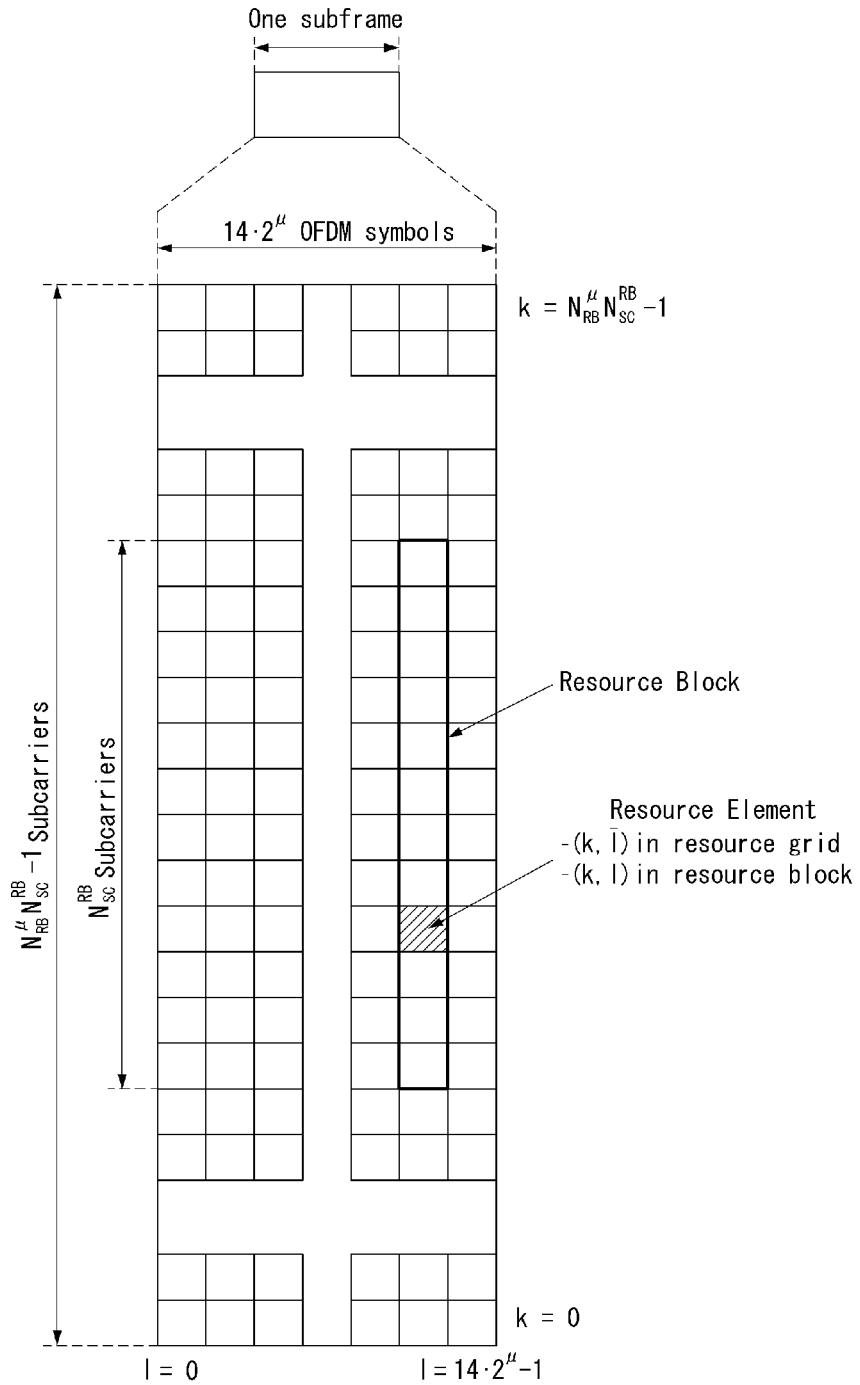

[FIG. 5]
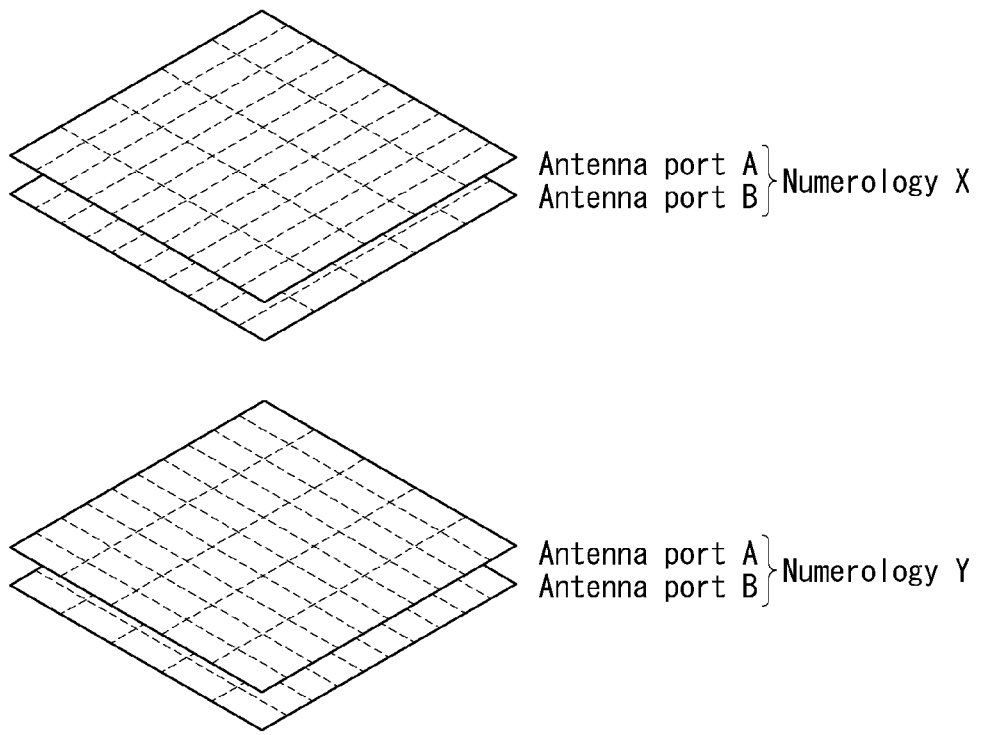
[FIG. 6]
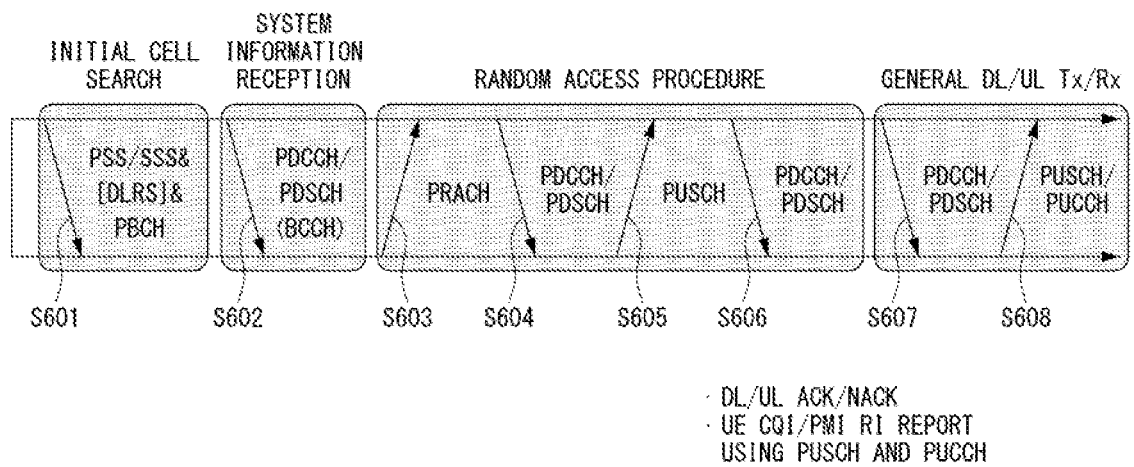

[FIG. 7]
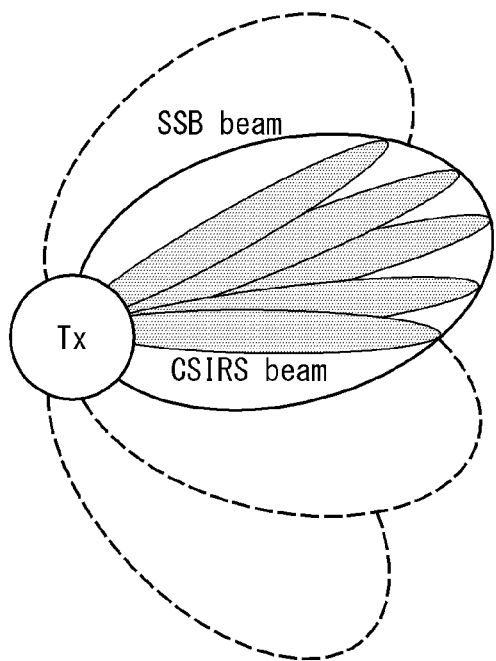
[FIG. 8]
Base station Rx beam sweeping					Base station beam being fixed
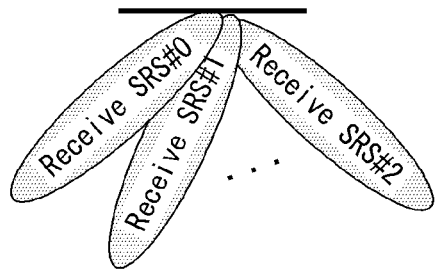				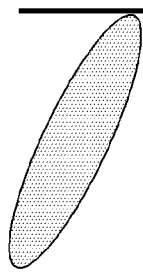
UE TX beam (being fixed)					UE Tx beam sweeping
(a)									(b)

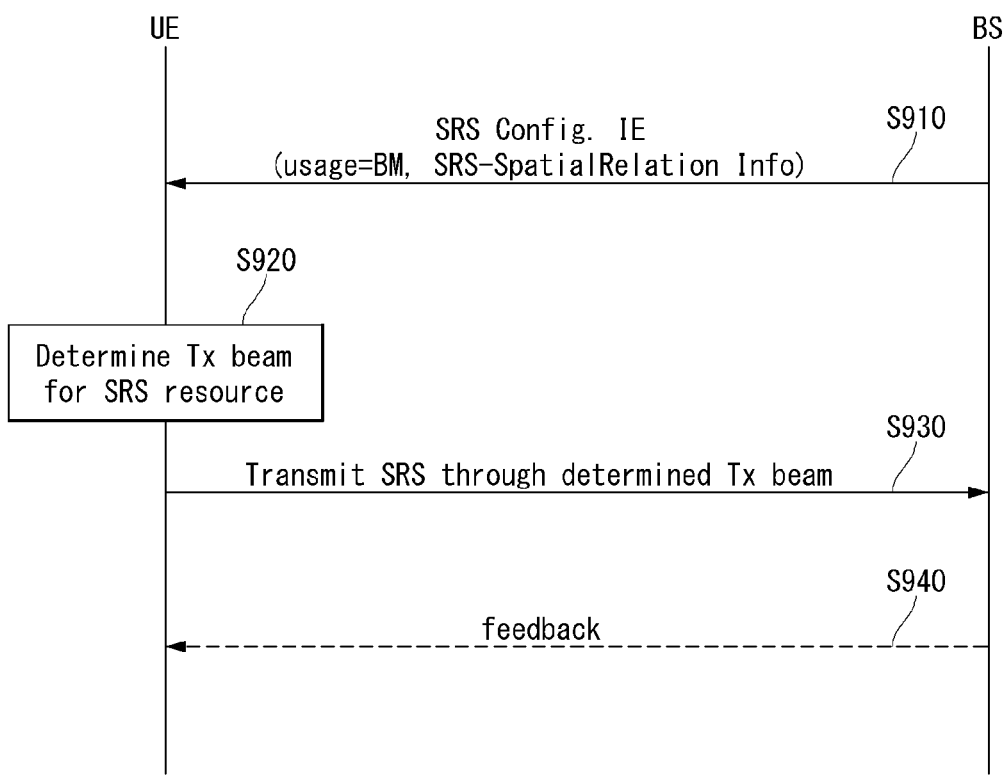
[FIG. 9]

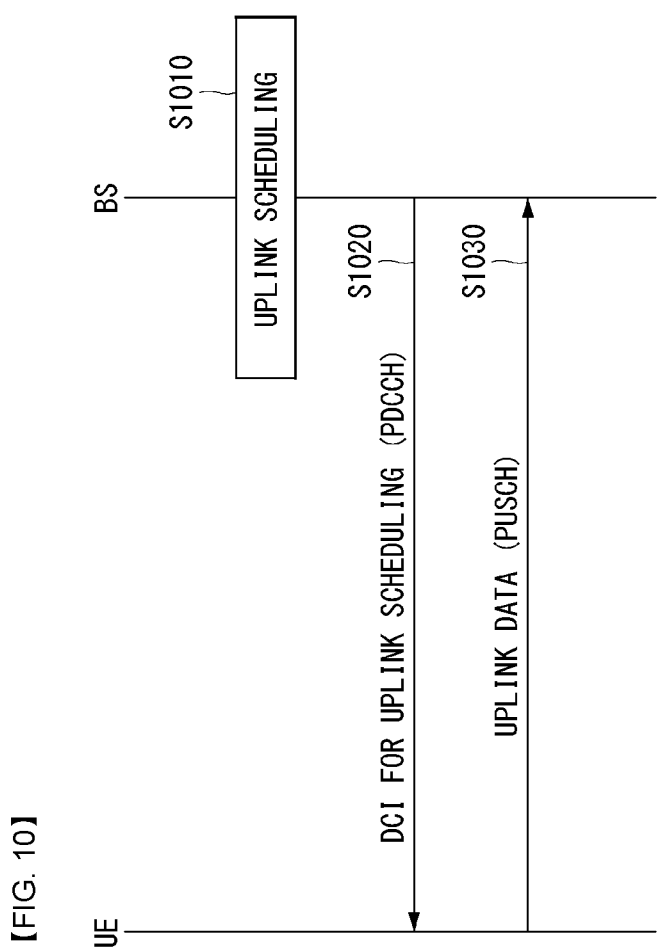

[FIG. 11]
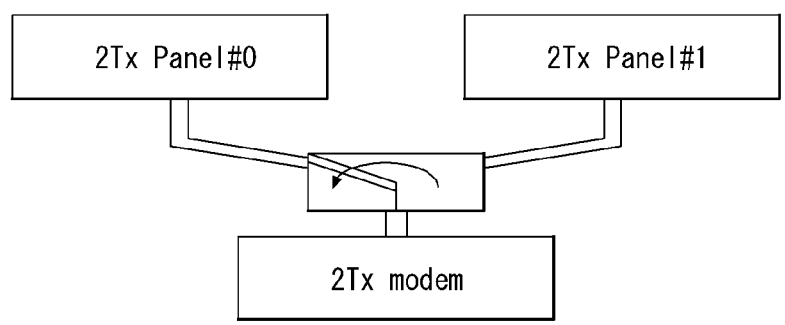
[FIG. 12]
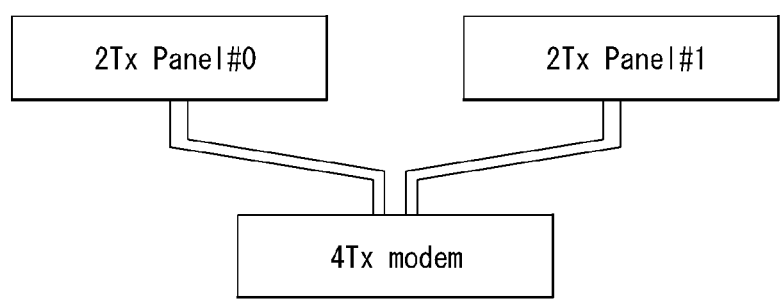

[FIG. 13]
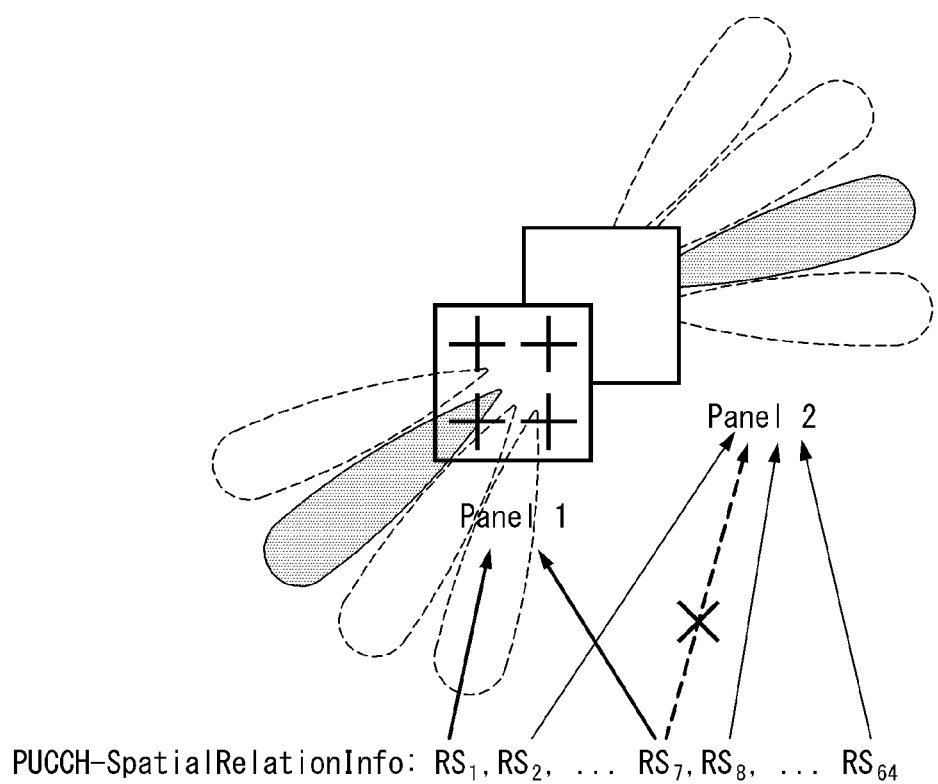

[FIG. 14]
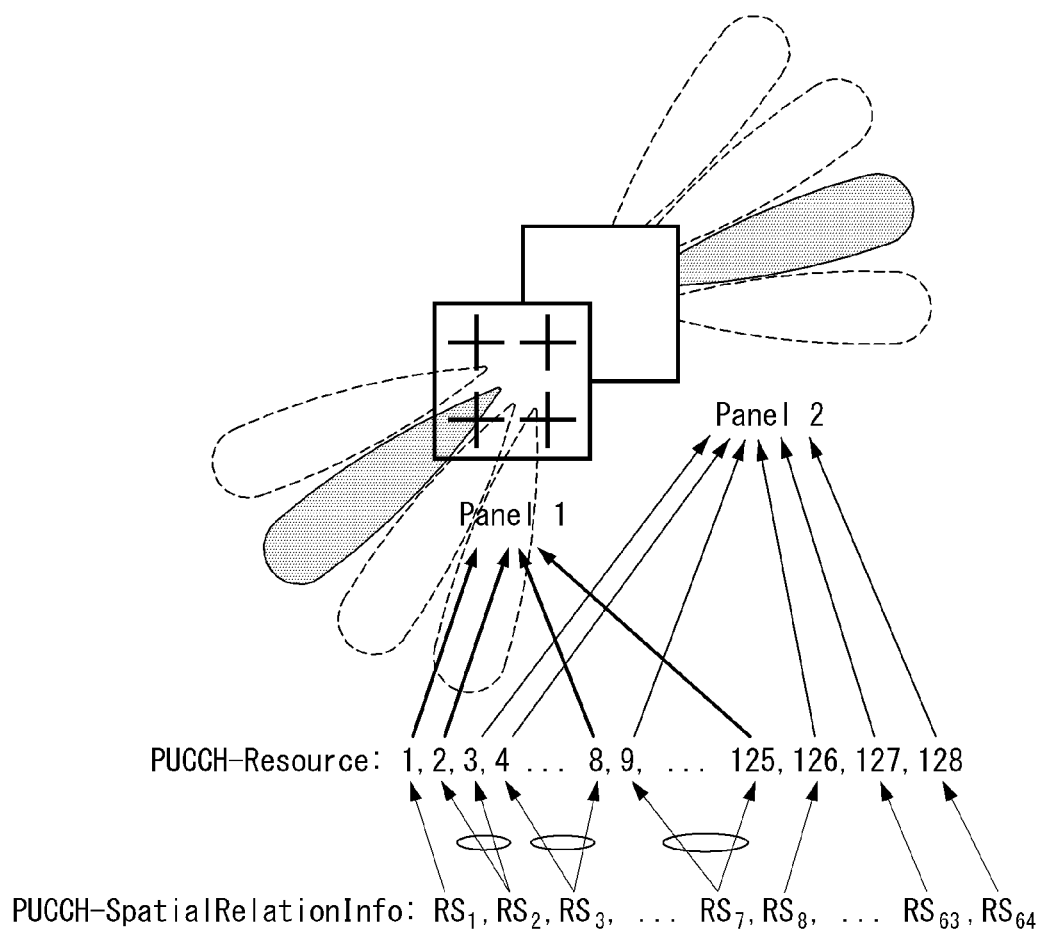

[FIG. 15]
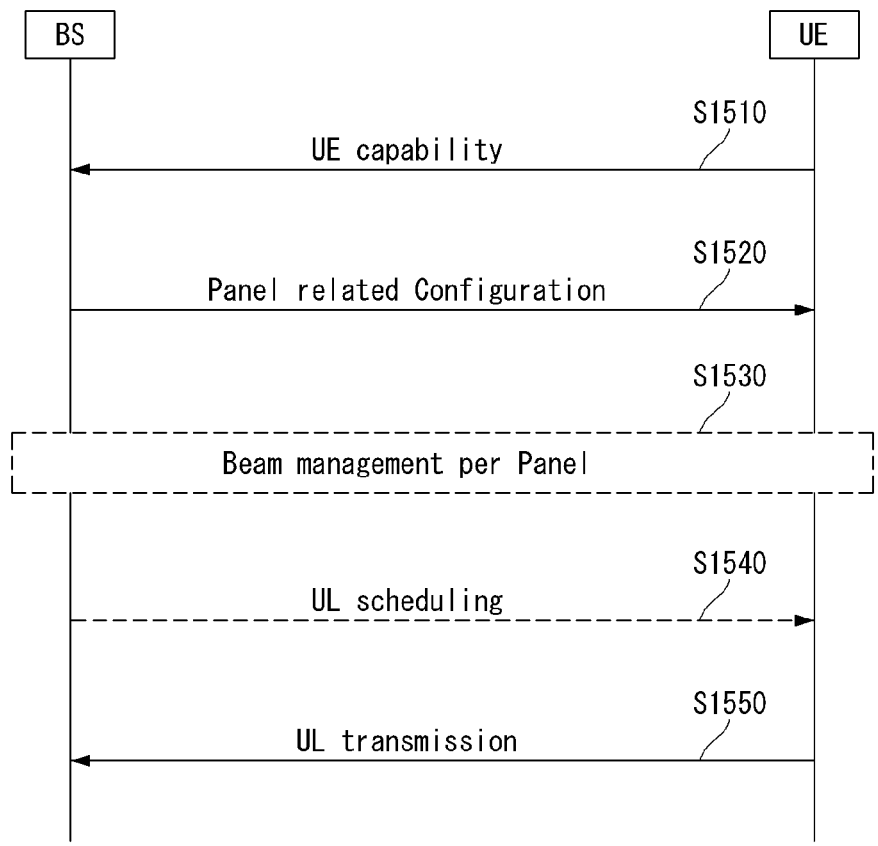

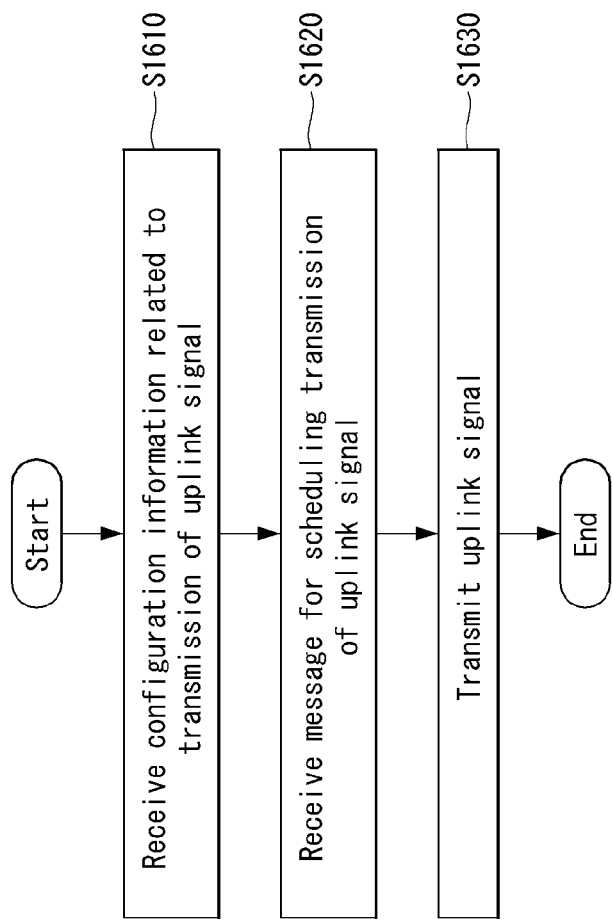
[FIG. 16]

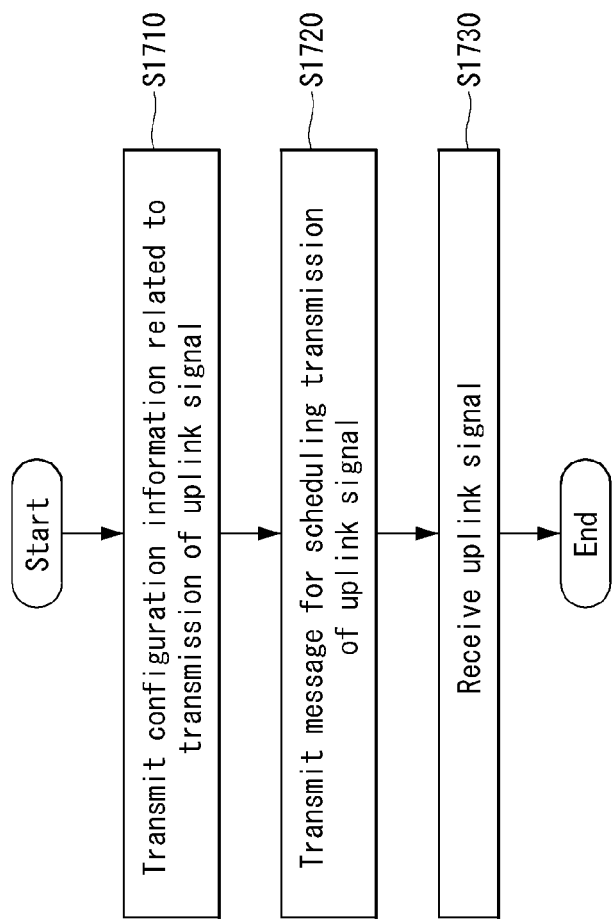
[FIG. 17]

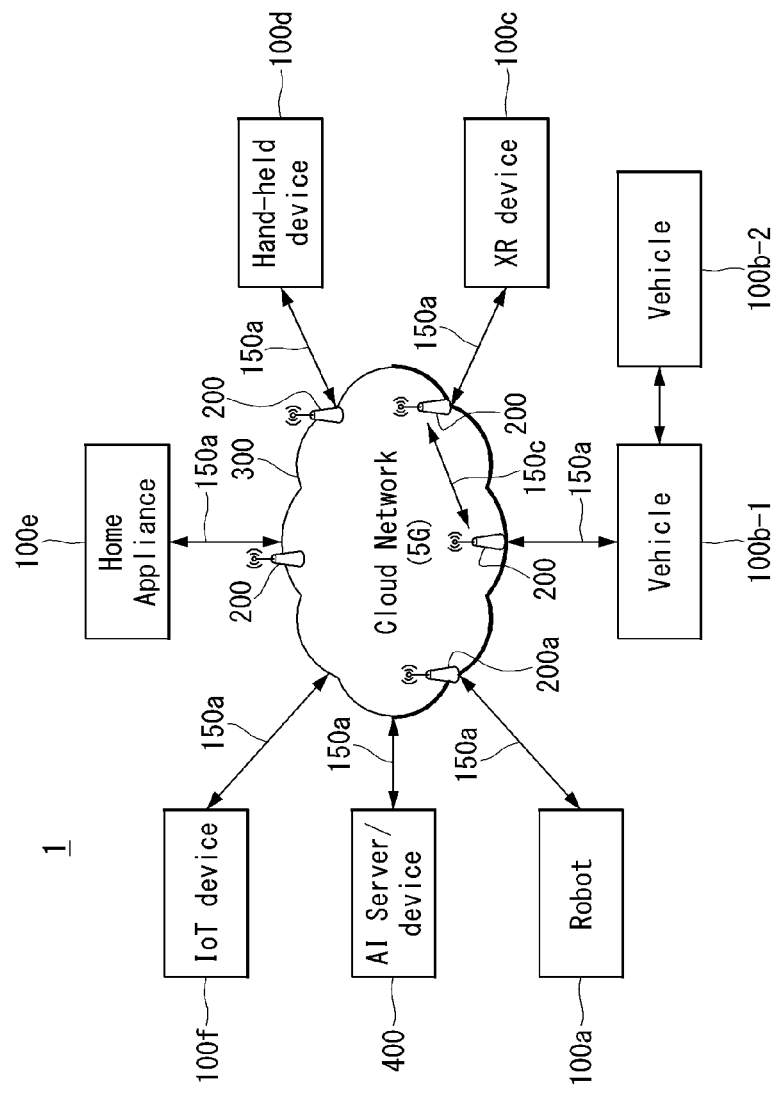

[FIG. 19]
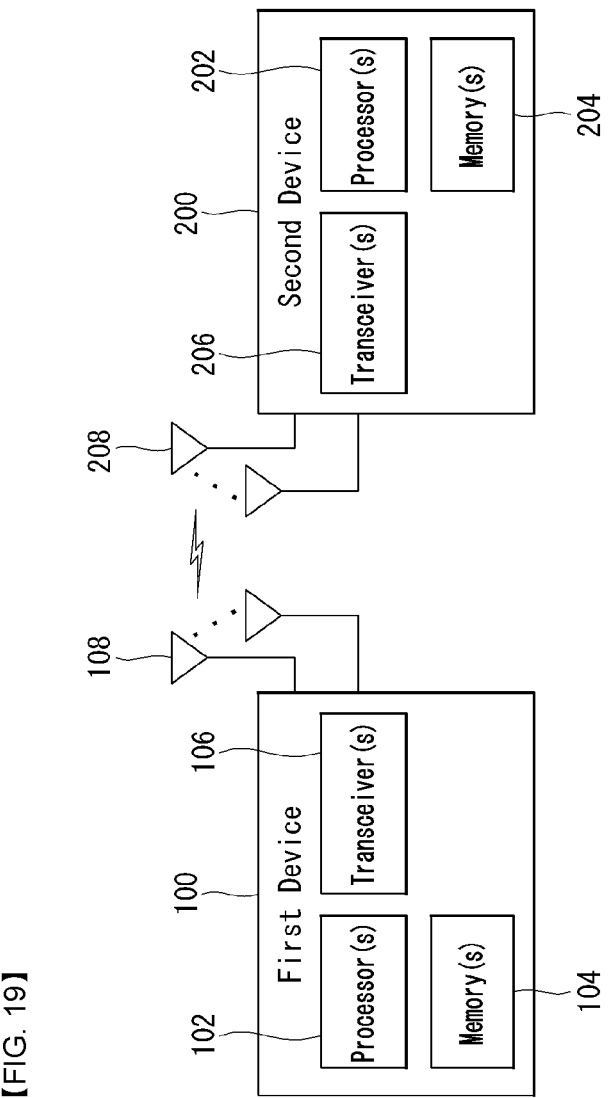

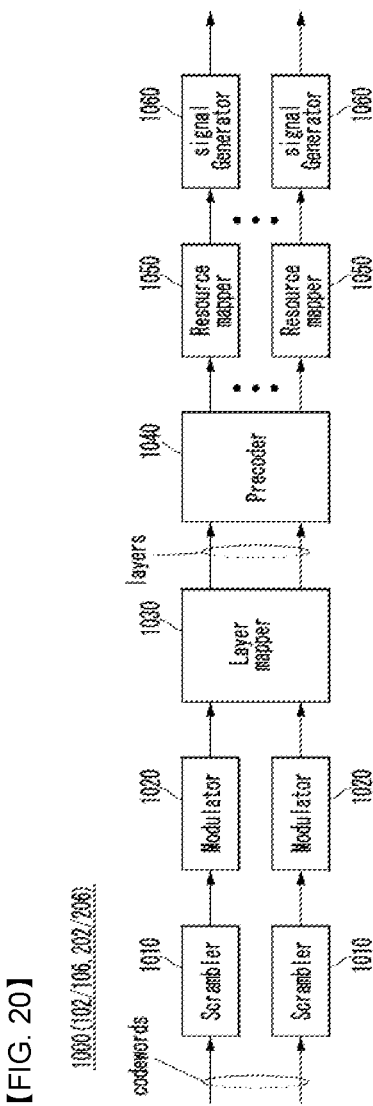
[FIG. 20]

[FIG. 21]
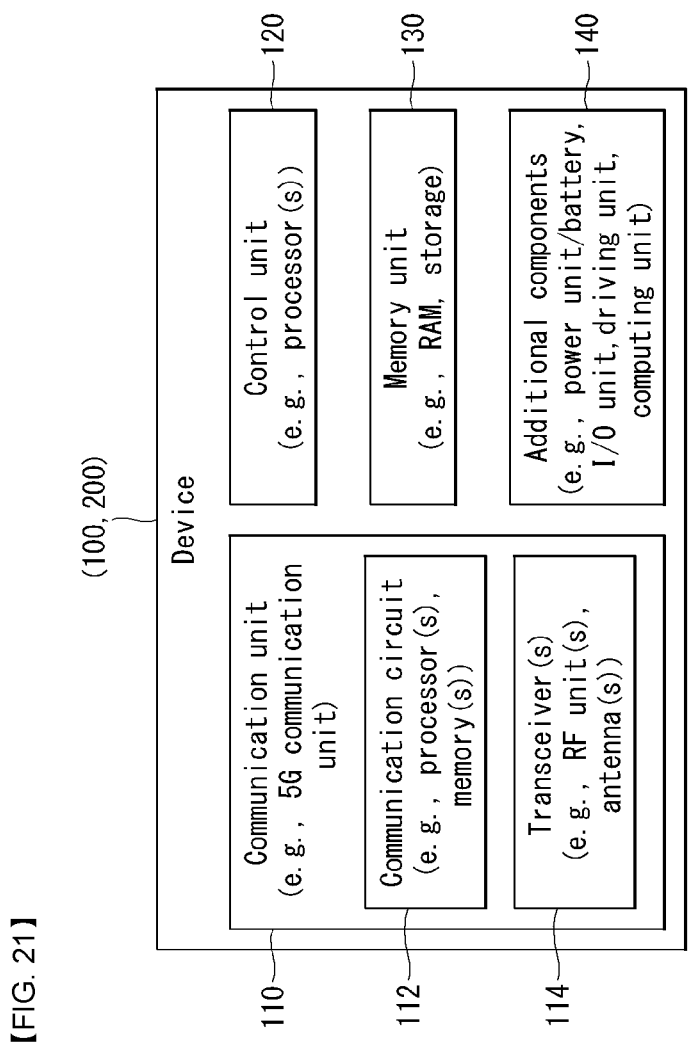

[FIG. 22]
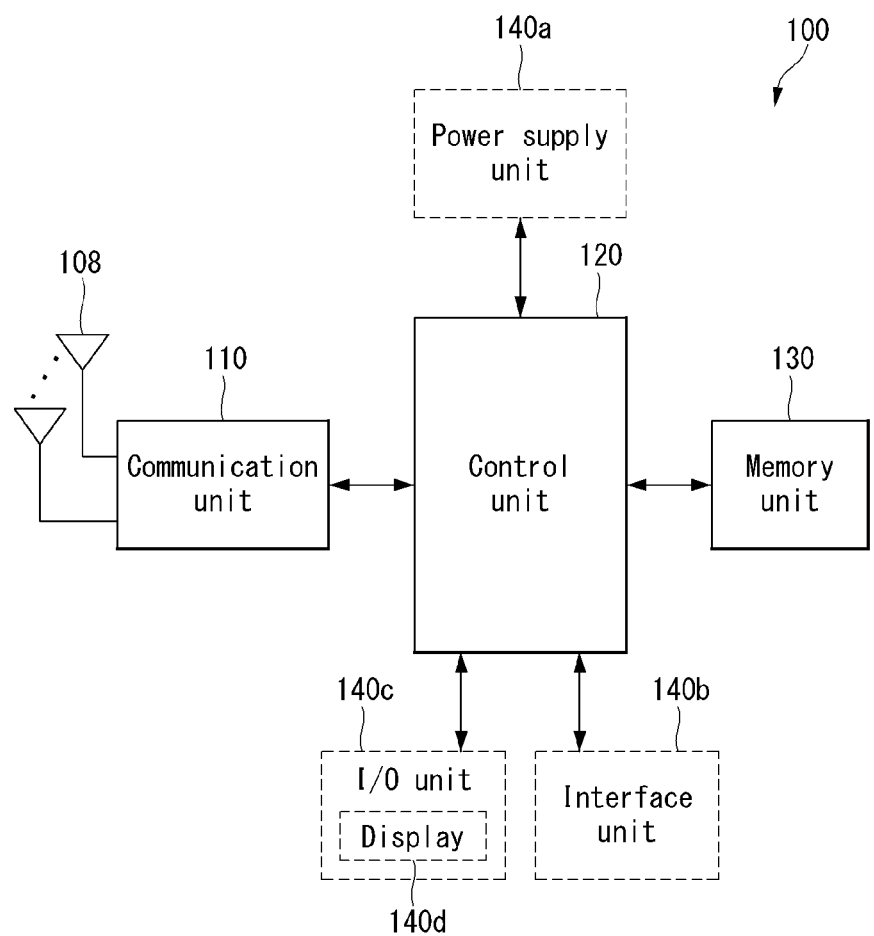

METHOD FOR TRANSMITTING AND RECEIVING UPLINK SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/005878, filed on May 4, 2020, which claims the benefit of earlier filing date and right of priority to Korean Application No. 10-2019-0051885, filed on May 2, 2019, the contents of which is hereby incorporated by reference herein in its entirety.

TECHNICAL FIELD

The present disclosure relates to a method for transmitting and receiving an uplink signal in a wireless communication system and apparatus therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method of transmitting an uplink signal. Specifically, the present disclosure proposes a method for transmitting a panel-specific uplink signal in consideration of the operation of a multi-panel UE. In addition, the present disclosure proposes a method for removing ambiguity in the operation of a UE in transmitting a panel-specific uplink signal.

The technical objects of the present disclosure are not limited to the aforementioned technical objects, and other technical objects, which are not mentioned above, will be apparently appreciated by a person having ordinary skill in the art from the following description.

Technical Solution

A method for transmitting an uplink signal by a terminal in a wireless communication system according to an embodiment of the present disclosure includes receiving configuration information related to transmission of an uplink signal, receiving a message for scheduling transmission of the uplink signal, and transmitting the uplink signal The uplink signal is transmitted based on beam information related to a specific panel, and the specific panel is determined based on at least one of spatial related information related to transmission of the uplink signal or a resource in which transmission of the uplink signal is scheduled.

The resource in which transmission of the uplink signal is scheduled is based on at least one of a plurality of resources associated with a preset panel. Based on that, the specific panel is different from the preset panel, the transmission of the uplink signal is i) dropped or ii) performed based on a previously used panel.

The previously used panel may be based on a panel used to transmit a specific reference signal within a specific time interval from a time at which the message is received.

The specific reference signal may be based on spatial related information related to the resource in which transmission of the uplink signal is scheduled.

The configuration information may include the spatial related information, and the message may include information on the resource in which transmission of the uplink signal is scheduled.

The uplink signal may be transmitted based on a panel related to a specific control resource set (CORESET), based on that the uplink signal is a physical uplink control channel (PUCCH) of a specific type.

A hybrid automatic repeat request (HARQ) response may be transmitted through the PUCCH of the specific type, and the specific control resource set may be related to the HARQ response.

The uplink signal may be transmitted based on a specific power control parameter, and the specific power control parameter may be determined based on the specific panel.

The specific power control parameter may be determined based on a combination of an ID related to the spatial related information and an ID related to the specific panel.

The uplink signal may be based on any one of a physical uplink control channel (PUCCH), a physical uplink shared channel, a physical random access channel (PRACH) and a sounding reference signal (SRS).

The spatial related information may be related to a downlink reference signal (DL RS) or an uplink reference signal (UL RS).

A terminal for transmitting an uplink signal in a wireless communication system according to another embodiment of the present disclosure includes one or more transceivers, one or more processors configured to control the one or more transceivers, and one or more memories operably connectable to the one or more processors and storing instructions for performing operations when transmission of an uplink signal is executed by the one or more processors.

The operations include receiving configuration information related to transmission of an uplink signal, receiving a message for scheduling transmission of the uplink signal, and transmitting the uplink signal.

The uplink signal is transmitted based on beam information related to a specific panel, and the specific panel is determined based on at least one of spatial related information related to transmission of the uplink signal or a resource in which transmission of the uplink signal is scheduled.

The resource in which transmission of the uplink signal is scheduled is based on at least one of a plurality of resources associated with a preset panel. Based on that the specific panel is different from the preset panel, the transmission of the uplink signal is i) dropped or ii) performed based on a previously used panel.

An apparatus according to another embodiment of the present disclosure includes one or more memories and one or more processors functionally connected to the one or more memories.

The one or more processors are configured to cause the apparatus to receive configuration information related to transmission of an uplink signal, to receive a message for scheduling transmission of the uplink signal, and to transmit the uplink signal.

The uplink signal is transmitted based on beam information related to a specific panel, and the specific panel is determined based on at least one of spatial related information related to transmission of the uplink signal or a resource in which transmission of the uplink signal is scheduled.

The resource in which transmission of the uplink signal is scheduled is based on at least one of a plurality of resources associated with a preset panel. Based on that the specific panel is different from the preset panel, the transmission of the uplink signal is i) dropped or ii) performed based on a previously used panel.

One or more non-transitory computer-readable media according to another embodiment of the present disclosure store one or more one or more commands.

One or more commands executable by one or more processors are configured to cause a terminal to receive configuration information related to transmission of an uplink signal, to receive a message for scheduling transmission of the uplink signal, and to transmit the uplink signal.

The uplink signal is transmitted based on beam information related to a specific panel, and the specific panel is determined based on at least one of spatial related information related to transmission of the uplink signal or a resource in which transmission of the uplink signal is scheduled.

The resource in which transmission of the uplink signal is scheduled is based on at least one of a plurality of resources associated with a preset panel. Based on that the specific panel is different from the preset panel, the transmission of the uplink signal is i) dropped or ii) performed based on a previously used panel.

A method for receiving an uplink signal by a base station in a wireless communication system according to another embodiment of the present disclosure includes transmitting configuration information related to transmission of an uplink signal, transmitting a message for scheduling transmission of the uplink signal, and receiving the uplink signal.

The uplink signal is transmitted based on beam information related to a specific panel, and the specific panel is determined based on at least one of spatial related information related to transmission of the uplink signal or a resource in which transmission of the uplink signal is scheduled.

The resource in which transmission of the uplink signal is scheduled is based on at least one of a plurality of resources associated with a preset panel. Based on that the specific panel is different from the preset panel, the transmission of the uplink signal is i) dropped or ii) performed based on a previously used panel.

A base station for receiving an uplink signal in a wireless communication system according to another embodiment of the present disclosure includes one or more transceivers, one or more processors configured to control the one or more transceivers, and one or more memories operably connectable to the one or more processors and storing instructions for performing operations when transmission of an uplink signal is executed by the one or more processors.

The operations include transmitting configuration information related to transmission of an uplink signal, transmitting a message for scheduling transmission of the uplink signal, and receiving the uplink signal.

The uplink signal is transmitted based on beam information related to a specific panel, and the specific panel is determined based on at least one of spatial related information related to transmission of the uplink signal or a resource in which transmission of the uplink signal is scheduled.

The resource in which transmission of the uplink signal is scheduled is based on at least one of a plurality of resources associated with a preset panel. Based on that the specific panel is different from the preset panel, the transmission of the uplink signal is i) dropped or ii) performed based on a previously used panel.

Advantageous Effects

According to an embodiment of the present disclosure, an uplink signal is transmitted based on beam information related to a specific panel, and the specific panel is determined based on at least one of spatial related information related to transmission of the uplink signal or a resource in which transmission of the uplink signal is scheduled. Accordingly, transmission of the uplink signal can be panel-specifically performed.

In addition, when the specific panel is determined based on the spatial related information and the resource in which transmission of the uplink signal is scheduled, spatial related information (e.g., a maximum number of configurable reference signals) that can be configured for a UE is not limited to the number of activated panels (e.g., Tx panels) of the UE. Accordingly, flexibility related to scheduling of panel-specific uplink signal transmission can be improved.

According to an embodiment of the present disclosure, the resource in which transmission of the uplink signal is scheduled is based on at least one of a plurality of resources associated with a preset panel, and transmission of the uplink signal is i) dropped or ii) transmitted based on a previously used panel, based on that the specific panel is different from the preset panel. Therefore, when panel related indications collide, ambiguity of UE operation is removed, and thus transmission of the uplink signal can be effectively performed, and reliability of uplink signal transmission can be secured by utilizing a previously used panel under specific conditions.

According to an embodiment of the present disclosure, the uplink signal can be transmitted based on a panel related to a specific control resource set (CORESET), based on that the uplink signal is a physical uplink control channel (PUCCH) of a specific type. A Hybrid Automatic Repeat Request response (HARQ response) is transmitted through the specific type of PUCCH, and the specific control resource set can be related to the HARQ response. The efficiency of panel-specific uplink signal transmission can be improved by setting an overriding operation under a certain condition, as described above.

According to an embodiment of the present disclosure, the uplink signal can be transmitted based on a specific power control parameter, and the specific power control parameter can be determined based on the specific panel. Specifically, the specific power control parameter can be determined based on a combination of an ID related to the spatial related information and an ID related to the specific panel. Power control is performed beam-specifically and panel-specifically. Accordingly, it is possible to effectively support operations and characteristics of multi-panel UEs based on various implementation methods in transmitting a panel-specific uplink signal.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 is a flowchart showing an example of an uplink transmission/reception operation to which a method proposed in the present disclosure may be applied.

FIG. 11 and FIG. 12 illustrate an example of multi-panel based on an RF switch applied to the disclosure.

FIG. 13 is a diagram showing an example of association between a panel and a reference signal proposed in the present disclosure.

FIG. 14 is a diagram showing another example of association between a panel and a reference signal proposed in the present disclosure.

FIG. 15 shows an example of signaling between a UE and a base station to which a method proposed in the present disclosure can be applied.

FIG. 16 is a flowchart illustrating a method for transmitting an uplink signal by a UE according to an embodiment of the present disclosure.

FIG. 17 is a flowchart illustrating a method for receiving an uplink signal by a base station according to another embodiment of the present disclosure.

FIG. 18 illustrates a communication system 1 applied to the present disclosure.

FIG. 19 illustrates wireless devices applicable to the present disclosure.

FIG. 20 illustrates a signal process circuit for a transmission signal.

FIG. 21 illustrates another example of a wireless device applied to the present disclosure.

FIG. 22 illustrates a hand-held device applied to the present disclosure.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)

3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOC SIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, µ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^μ \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max}N_f/100) \cdot T_s=10$ nm. Here, the radio frame is constituted of 10 subframes each of which has a period of $T_{sf}(\Delta f_{max}N_f/1000) \cdot T_s$ 1 ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^μ \in \{0, \ldots, N_{subframe}^{slots, μ}-1\}$ in the subframe and in ascending order of $n_{s,f}^μ \in \{0, \ldots, N_{frame}^{slots, μ}-1\}$ in the radio frame. One slot includes consecutive OFDM symbols of $N_{symb}^μ$, and $N_{symb}^μ$ is determined according to the used numerology and slot configuration. In the subframe, the start of slot $n_s^μ$ is temporally aligned with the start of $n_s^μ N_{symb}^μ$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, μ}$ of slots per radio frame, and the number $N_{slot}^{subframe, μ}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^μ N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^μ N_{sc}^{RB}$ subcarriers, and $2^μ N_{symb}^{(μ)}$ OFDM symbols, where $N_{RB}^μ \leq N_{RB}^{max, μ}$. $N_{RB}^{max,μ}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, ..., $N_{RB}^μ N_{sc}^{BB}-1$ is an index on a frequency domain, and l=0, ..., $2^μ N_{symb}^{(μ)}-1$ refers to a location of a symbol in a subframe. The index pair (k,l) is used to refer to a resource element in a slot, where l=0, ..., $N_{symb}^{\mu}-1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2.

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \qquad [\text{Equation 1}]$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad [\text{Equation 2}]$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM related beam indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=        SEQUENCE {
    tci-StateId          TCI-StateId,
    qcl-Type1            QCL-Info,
    qcl-Type2            QCL-Info
    ...
}
QCL-Info             SEQUENCE {
    cell                 ServCellIndex
    bwp-Id               BWP-Id
    referenceSignal      CHOICE {
        csi-rs               NZP-CSI-RS-ResourceId,
        ssb                  SSB-Index
    },
    qcl-Type             ENUMERATED {typeA, typeB, typeC, typeD},
    ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config 1E) including (higher layer parameter) usage parameter set to 'beam management' in S910.

Table 6 represents an example of SRS-Config information element (IE), and the SRS-Config 1E is used for SRS transmission configuration. The SRS-Config 1E contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                           SEQUENCE {
    srs-ResourceSetToReleaseList             SEQUENCE (SIZE(1..maxNrofSRS-
ResourceSets)) OF SRS-ResourceSetId          OPTIONAL,  -- Need N
    srs-ResourceSetToAddModList              SEQUENCE (SIZE(1..maxNrofSRS-
ResourceSets)) OF SRS-ResourceSet            OPTIONAL,  -- Need N
    srs-ResourceToReleaseList                SEQUENCE (SIZE(1..maxNrofSRS-
Resources)) OF SRS-ResourceId                OPTIONAL, -- Need N
    srs-ResourceToAddModList                 SEQUENCE (SIZE(1..maxNrofSRS-
Resources)) OF SRS-Resource                  OPTIONAL,  -- Need N
    tpc-Accumulation                         ENUMERATED {disabled}
    ...
}
SRS-ResourceSet ::=                      SEQUENCE {
    srs-ResourceSetId                        SRS-ResourceSetId,
    srs-ResourceIdList                       SEQUENCE (SIZE(1..maxNrofSRS-
ResouroesPerSet)) OF SRS-ResourceId          OPTIONAL, -- Cond Setup
    resourceType                             CHOICE {
        aperiodic                                SEQUENCE {
            aperiodicSRS-ResourceTrigger             INTEGER (1..maxNrofSRS-
TriggerStates-1),
            csi-RS                                   NZP-CSI-RS-ResourceId
            slotOffset                               INTEGER (1..32)
            ...
        },
        semi-persistent                          SEQUENCE {
            associatedCSI-RS                         NZP-CSI-RS-ResourceId
            ...
        },
        periodic                                 SEQUENCE {
            associatedCSI-RS                         NZP-CSI-RS-ResourceId
            ...
        }
    },
    usage                                    ENUMERATED {beamManagement,
codebook, nonCodebook, antennaSwitching},
    alpha                                    Alpha
    p0                                       INTEGER (-202..24)
    pathlossReferenceRS                      CHOICE {
        ssb-Index                                SSB-Index,
        csi-RS-Index                             NZP-CSI-RS-ResonrceId
SRS-SpatialRelationInfo ::=              SEQUENCE {
    servingCellId                            ServCellIndex
    referenceSignal                          CHOICE {
        ssb-Index                                SSB-Index,
        csi-RS-Index                             NZP-CSI-RS-ResourceId,
        srs                                      SEQUENCE {
            resourceId                               SRS-ResourceId,
            uplinkBWP                                BWP-Id
        }
    }
}
SRS-ResourceId ::=                       INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config 1E in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':
i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or
ii) if SRS-SpatialRelationInfo is set to 'CSI-RS,' the UE transmits the SRS resource with the same spatial domain transmission filter used for the reception of the periodic CSI-RS or SP CSI-RS; or
iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.
i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.
ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.
iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

FIG. 10 is a flowchart showing an example of an uplink transmission/reception operation to which a method proposed in the present disclosure may be applied.

Referring to FIG. 10, the eNB schedules uplink transmission such as the frequency/time resource, the transport layer, an uplink precoder, the MCS, etc., (S1010). In particular, the eNB may determine a beam for PUSCH transmission of the UE through the aforementioned operations.

The UE receives DCI for downlink scheduling (i.e., including scheduling information of the PUSCH) on the PDCCH (S1020).

DCI format 0_0 or 0_1 may be used for the uplink scheduling and in particular, DCI format 0_1 includes the following information.

Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S1030).

When the UE detects a PDCCH including DCI format 0_0 or 0_1, the UE transmits the corresponding PUSCH according to the indication by the corresponding DCI.

Two transmission schemes, i.e., codebook based transmission and non-codebook based transmission are supported for PUSCH transmission:
i) When higher layer parameter 'txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'.

When higher layer parameter 'txConfig' set to 'codebook' is configured for the UE, at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

The above description (3GPP system, frame structure, NR system, etc.) can be applied in combination with methods proposed in the present disclosure which will be described later or supplemented to clarify the technical characteristics of the methods proposed in the present disclosure. The methods described below are only divided for convenience of description, and some components of one method may be substituted with some components of another method or may be applied in combination therewith.

Hereinafter, matters related to the definition of a panel in the present disclosure will be described in detail.

A "panel" referred to in the present disclosure may be based on at least one of the following definitions.

According to an embodiment, the "panel" may be interpreted/applied by being transformed into "one panel or a plurality of panels" or a "panel group". The panel may be related to a specific characteristic (e.g., a timing advance (TA), a power control parameter, etc.). The plurality of panels may be panels having a similarity/common value in terms of the specific characteristic.

According to an embodiment, a "panel" may be interpreted/applied by being transformed into "one antenna port or a plurality of antenna ports", "one uplink resource or a plurality of uplink resources", an "antenna port group" or an "uplink resource group (or set)". The antenna port or the uplink resource may be related to a specific characteristic (e.g., a timing advance (TA), a power control parameter, etc.). The plurality of antenna ports (uplink resources) may be antenna ports (uplink resources) having a similarity/common value in terms of the specific characteristic.

According to an embodiment, a "panel" may be interpreted/applied by being transformed into "one beam or a plurality of beams" or "at least one beam group (or set)". The beam (beam group) may be related to a specific characteristic (e.g., a timing advance (TA), a power control parameter, etc.). The plurality of beams (beam groups) may be beams (beam groups) having a similarity/common value in terms of the specific characteristic.

According to an embodiment, a "panel" may be defined as a unit for a UE to configure a transmission/reception beam. For example, a "transmission panel (Tx panel)" may be defined as a unit in which a plurality of candidate transmission beams can be generated by one panel, but only one of the beams can be used for transmission at a specific time (that is, only one transmission beam (spatial relation information RS) can be used per Tx panel in order to transmit a specific uplink signal/channel).

According to an embodiment, a "panel" may refer to "a plurality antenna ports (or at least one antenna port)", a "antenna port group" or an "uplink resource group (or set)" with common/similar uplink synchronization. Here, the "panel" may be interpreted/applied by being transformed into a generalized expression of "uplink synchronization unit (USU)". Alternatively, the "panel" may be interpreted/applied by being transformed into a generalized expression of "uplink transmission entity (UTE)".

Additionally, the "uplink resource (or resource group)" may be interpreted/applied by being transformed into a resource (or a resource group (set)) of a physical uplink shared channel (PUSCH)/physical uplink control channel (PUCCH)/sounding reference signal (SRS)/physical random access channel (PRACH). Conversely, a resource (resource group) of a PUSCH/PUCCH/SRS/PRACH may be interpreted/applied as an "uplink resource (or resource group)" based on the definition of the panel.

In the present disclosure, an "antenna (or antenna port)" may represent a physical or logical antenna (or antenna port).

As described above, a "panel" referred to in the present disclosure can be interpreted in various ways as "a group of UE antenna elements", "a group of UE antenna ports", "a group of logical antennas", and the like. Which physical/logical antennas or antenna ports are mapped to one panel may be variously changed according to position/distance/correlation between antennas, an RF configuration and/or an antenna (port) virtualization method. The phaming process may vary according to a UE implementation method.

In addition, the "panel" referred to in the present disclosure may be interpreted/applied by being transformed into "a plurality of panels" or a "panel group" (having similarity in terms of specific characteristics).

Hereinafter, matters related to implementation of a multi-panel will be described.

In the implementation of a UE in a high frequency band, modeling of a UE having a plurality of panels consisting of one or a plurality of antennas is being considered (e.g., bi-directional two panels in 3GPP UE antenna modeling). Various forms may be considered in implementing such a multi-panel. This is described below in detail with reference to FIGS. 11 and 12.

FIG. 11 and FIG. 12 illustrate an example of multi-panel based on an RF switch applied to the disclosure.

A plurality of panels may be implemented based on an RF switch.

Referring to FIG. 11, only one panel may be activated at a time, and signal transmission may be impossible for a predetermined time during which the activated panel is changed (i.e., panel switching).

FIG. 12 illustrates a plurality of panels according to different implementation schemes. Each panel may have an RF chain connected thereto so that it may be activated at any time. In this case, the time taken for panel switching may be zero or very short, and depending on the modem and power amplifier configuration, multiple panels may be simultaneously activated to transmit signals simultaneously (STxMP: simultaneous transmission across multi-panel).

In a UE having a plurality of panels described above, the radio channel state may be different for each panel, and the RF/antenna configuration may be different for each panel. Therefore, a method for estimating a channel for each panel is required. In particular, 1) to measure uplink quality or manage uplink beams or 2) to measure downlink quality for each panel or manage downlink beams using channel reciprocity, the following procedure is required.

A procedure for transmitting one or a plurality of SRS resources for each panel (here, the plurality of SRS resources may be SRS resources transmitted on different beams within one panel or SRS resources repeatedly transmitted on the same beam).

For convenience of description below, a set of SRS resources transmitted based on the same usage and the same time domain behavior in the same panel is referred to as an SRS resource group. The usage may include at least one of beam management, antenna switching, codebook-based PUSCH, or non-codebook based PUSCH. The time-domain behavior may be an operation based on any one of aperiodic, semi-persistent, and periodic.

The SRS resource group may use the configuration for the SRS resource set supported in the Rel-15 NR system, as it is, or separately from the SRS resource set, one or more SRS resources (based on the same usage and time-domain behavior) may be configured as the SRS resource group. In relation to the same usage and time-domain behavior, in the case of Rel-15, a plurality of SRS resource sets may be configured only when the corresponding usage is beam management. It is defined that simultaneous transmission is impossible between SRS resources configured in the same SRS resource set, but simultaneous transmission is possible between the SRS resources belonging to different SRS resource sets.

When considering the panel implementation scheme and multi-panel simultaneous transmission as shown in FIG. 12, the concept described above in connection with the SRS resource set may be directly applied to the SRS resource group. When considering panel switching according to the panel implementation scheme according to FIG. 11, an SRS resource group may be defined separately from the SRS resource set.

For example, a specific ID may be assigned to each SRS resource such that resources having the same ID belong to the same SRS resource group (SRS resource group) and resources having different IDs belong to different resource groups.

For example, when four SRS resource sets (e.g., RRC parameter usage is configured to 'BeamManagement') configured for a beam management (BM) usage are configured to the UE, each SRS resource set may be configured and/or defined to correspond to each panel of the UE. As an example, when four SRS resource sets are represented by SRS resource sets A, B, C, and D, and the UE implements a total of four (transmission) panels, each SRS resource set corresponds to one (transmission) panel to perform the SRS transmission.

As an example, implementation of the UE shown in Table 7 may be possible.

TABLE 7

| Maximum number of SRS resource sets across all time domain behavior (periodic/semi-persistent/aperiodic) | Additional constraint on the maximum of SRS resource sets per supported time domain behavior (periodic/semi-persistent/aperiodic) |
| --- | --- |
| 1 | 1 |
| 2 | 1 |
| 3 | 1 |
| 4 | 2 |
| 5 | 2 |
| 6 | 2 |

TABLE 7-continued

| Maximum number of SRS resource sets across all time domain behavior (periodic/semi-persistent/aperiodic) | Additional constraint on the maximum of SRS resource sets per supported time domain behavior (periodic/semi-persistent/aperiodic) |
| --- | --- |
| 7 | 4 |
| 8 | 4 |

Referring to contents of Table 7, when the UE reports (or transmits), to the BS, UE capability information in which the number of SRS resource sets which may be supported by the UE itself is 7 or 8, the corresponding UE may be configured with up to a total of four SRS resource sets (for the BM usage) from the BS. In this case, as an example, the UE may also be defined, configured, and/or indicated to perform uplink transmission by making each of the SRS resource sets (for the BM usage) correspond to each panel (transmission panel and/or reception panel) of the UE. That is, an SRS resource set(s) for a specific usage (e.g., BM usage) configured to the UE may be defined, configured, and/or indicated to correspond to the panel of the UE. As an example, when the BS (implicitly or explicitly) configures and/or indicates, to the UE, a first SRS resource set in relation to the uplink transmission (configured for the BM usage), the corresponding UE may recognize to perform the uplink transmission by using a panel related (or corresponding) to the first SRS resource set.

Further, like the UE, when the UE that supports four panels transmits each panel to correspond to one SRS resource set for the BM usage, information on the number of SRS resources configurable per SRS resource set may also be include in the capability information of the UE. Here, the number of SRS resources may correspond to the number of transmittable beams (e.g., uplink beams) per panel of the UE. For example, the UE in which four panels are implemented may be configured to perform the uplink transmission in such a manner that two uplink beams correspond to two configured RS resources, respectively for each panel.

With respect to multi-panel transmission, UE category information may be defined in order for a UE to report performance information thereof related to multi-panel transmission. As an example, three multi-panel UE (MPUE) categories may be defined, and the MPUE categories may be classified according to whether a plurality of panels can be activated and/or whether transmission using a plurality of panels is possible.

In the case of the first MPUE category (MPUE category 1), in a UE in which multiple panels are implemented, only one panel may be activated at a time, and a delay for panel switching and/or activation may be set to [X]ms. For example, the delay may be set to be longer than a delay for beam switching/activation and may be set in units of symbols or slots.

In the case of the second MPUE category (MPUE category 2), in a UE in which multiple panels are implemented, multiple panels may be activated at a time, and one or more panels may be used for transmission. That is, simultaneous transmission using panels may be possible in the second MPUE category.

In the case of the third MPUE category (MPUE category 3), in a UE in which multiple panels are implemented, multiple panels may be activated at a time, but only one panel may be used for transmission.

With respect to multi-panel-based signal and/or channel transmission/reception proposed in the present disclosure, at least one of the three MPUE categories described above may be supported. For example, in Rel-16, MPUE category 3 among the following three MPUE categories may be (optionally) supported.

In addition, information on an MPUE category may be predefined on the standards or semi-statically configured according to a situation in a system (i.e., a network side or a UE side) and/or dynamically indicated. In this case, configuration/indication related to multi-panel-based signal and/or channel transmission/reception may be performed in consideration of the MPUE category.

Hereinafter, matters related to configuration/indication related to panel-specific transmission/reception will be described.

With respect to a multi-panel-based operation, transmission and reception of signals and/or channels may be panel-specifically performed. Here, "panel-specific" may mean that transmission and reception of signals and/or channels in units of panels can be performed. Panel-specific transmission/reception may also be referred to as panel-selective transmission/reception.

With respect to panel-specific transmission and reception in the multi-panel-based operation proposed in the present disclosure, a method of using identification information (e.g., an identifier (ID), an indicator, etc.) for setting and/or indicating a panel to be used for transmission and reception among one or more panels may be considered.

As an example, an ID for a panel may be used for panel selective transmission of a PUSCH, a PUCCH, an SRS, and/or a PRACH among a plurality of activated panels. The ID may be set/defined based on at least one of the following four methods (Alts 1, 2, 3, and 4).

Alt.1: ID for a panel may be an SRS resource set ID.

As an example, when the aspects according to a) to c) below are considered, it may be desirable that each UE Tx panel correspond to an SRS support set that is set in terms of UE implementation.

a) SRS resources of multiple SRS resource sets having the same time domain operation are simultaneously transmitted in the same bandwidth part (BWP).

b) Power control parameters are set in units of SRS resource sets.

c) A UE reports a maximum of 4 SRS resource sets (which may correspond to up to 4 panels) according to A supported time domain operation.

In the case of Alt.1 method, an SRS resource set related to each panel may be used for "codebook" and "non-codebook" based PUSCH transmission. In addition, a plurality of SRS resources belonging to a plurality of SRS resource sets may be selected by extending an SRI field of DCI. A mapping table between a sounding reference signal resource indicator (SRI) and an SRS resource may need to be extended to include the SRS resource in all SRS resource sets.

Alt.2: ID for a panel may be an ID (directly) associated with a reference RS resource and/or a reference RS resource set.

Alt.3: ID for a panel may be an ID directly associated with a target RS resource (reference RS resource) and/or a reference RS resource set.

In the case of Alt.3 method, configured SRS resource set(s) corresponding to one UE Tx panel can be controlled more easily, and the same panel identifier can be allocated to a plurality of SRS resource sets having different time domain operations.

Alt.4: ID for a panel may be an ID additionally set in spatial relation info (e.g., RRC parameter (SpatialRelation-Info)).

The Alt.4 method may be a method of newly adding information for indicating an ID for a panel. In this case, configured SRS resource set(s) corresponding to one UE Tx panel can be controlled more easily, and the same panel identifier can be allocated to a plurality of SRS resource sets having different time domain operations.

As an example, a method of introducing a UL TCI similarly to the existing DL TCI (Transmission Configuration Indication) may be considered. Specifically, UL TCI state definition may include a list of reference RS resources (e.g., SRS, CSI-RS and/or SSB). The current SRI field may be reused to select a UL TCI state from a configured set. Alternatively, a new DCI field (e.g., UL-TCI field) of DCI format 0_1 may be defined for the purpose of indicating the UL TCI state.

Information (e.g., panel ID, etc.) related to the above-described panel-specific transmission and reception can be transmitted through higher layer signaling (e.g., RRC message, MAC-CE, etc.) and/or lower layer signaling (e.g., L1 signaling, DCI, etc.). The information may be transmitted from a base station to a UE or from the UE to the base station according to circumstances or as necessary.

Further, the corresponding information may be set in a hierarchical manner in which a set for a candidate group is set and specific information is indicated.

Further, the above-described panel-related identification information may be set in units of a single panel or in units of multiple panels (e.g., a panel group or a panel set).

With respect to the multi-beam-based operation in the above-described NR system, improvement is discussed in the following direction.

Improvement of multi-beam operation primarily targeting FR 2 operation:

A study on UL and/or DL transmission beam selection can be performed in a direction to reduce latency and overhead.

Selection of a UL transmission beam can be specified for a multi-panel operation that facilitates beam selection for each panel.

Beam failure recovery for SCell of DL/UL as well as DL-only in which PCell can operate in FR1 as well as FR2 can be specified.

Measurement and reporting of L1-RSRQ or L1-SINR can be specified.

The following agreements may be considered in relation to UL transmission beam selection for multi-panel operation.

1. An identifier (ID) is supported, which may be used for representing the panel-specific UL transmission. The corresponding identifier may be utilizing or modifying an existing definition. Alternatively, the corresponding identifier may be newly defined.

2. The identifier (ID) which may be used for representing the panel-specific UL transmission may be one of the following Alt.1 to Alt.4.

Alt.1: SRS resource set ID

Alt.2: ID, which is directly associated to a reference RS resource and/or resource set Alt.3: ID, which is directly associated to a reference RS resource and/or resource set Alt.4: ID which is additionally configured in spatial relation info 3. The multi-panel UE (MPUE) may be classified as follows.

MPUE-Assumption1: Multiple panels are implemented on a UE and only one panel may be activated at a time, with panel switching/activation delay of [X] ms.

MPUE-Assumption2: Multiple panels are implemented on a UE and multiple panels may be activated at a time and one or more panels may be used for transmission.

MPUE-Assumption3: Multiple panels are implemented on a UE and multiple panels may be activated at a time but only one panel may be used for transmission.

4. Matters related to a UE based on MPUE-Assumption 3 are as follows.

MPUE-Assumption 3: Multiple panels are implemented in a UE and the multiple panels can be activated at a time, but only one panel can be used for transmission. However, it is not always necessary for a UE based on MPUE-Assumption 3 to simultaneously activate the multiple panels. The corresponding UE can control panel activation/deactivation.

5. With regard to possible use cases, the following may be considered.

Improvement of uplink coverage for FR2 in consideration of UE power consumption

Details on panel identification and corresponding panel definition

Enhancement of simultaneous transmission across multiple panels

6. An ID agreed for a panel (except for reuse of existing IDs) can be used for panel selection based transmission of a PUSCH, a PUCCH and an SRS among several activated panels.

In consideration of beam correspondence in a UE, whether or not an explicit/implicit indication of a panel is included may be further discussed. In addition, it can be considered whether the ID can be used for panel-specific PRACH transmission.

The proposal of the present disclosure may be applied to all of MPUE categories 1/2/3.

Further, a panel identifier (e.g., ID) configuration method for panel selection based transmission of an uplink channel/RS such as a PUSCH/PUCCH/SRS/PRACH may be considered.

Hereinafter, the present disclosure proposes methods related to panel-selective transmission that can be applied in consideration of the above. In the present disclosure, panel-selective transmission may mean a transmission method configured/indicated/performed in units of panels (sets or groups) and may also be referred to as a panel-specific transmission method.

Specifically, the present disclosure proposes a panel-selective PUCCH transmission method (hereinafter, proposal 1) and a panel-selective SRS transmission method (hereinafter, proposal 2).

In addition, although panel-selective transmission for a PUCCH/SRS is mainly described in the present disclosure, some or all of the proposed methods may be extended and applied to transmission of uplink channels/reference signals other than the PUCCH/SRS.

Further, panel or panel-related operations mentioned in the methods proposed in the present disclosure may be based on the definition of the panel described above or based on the definition of the panel below.

The definition of "panel" may be based on at least one of the following definitions according to different UE implementations.

Antenna group unit for independent control of beams
A single beam can be selected in a panel and used for uplink transmission
A plurality of beams (each selected for each panel) across different panels can be used for uplink transmission
Antenna group unit for controlling transmit power Antenna group unit for controlling transmission timing

[Proposal 1]

Hereinafter, panel-selective PUCCH transmission will be described in detail.

Panel selective PUCCH transmission can be classified in two different methods as follows.

Option 1: A panel can be identified in PUCCH-SpatialRelationInfo.

Option 2: A panel can be identified according to a PUCCH resource configuration, for example, a PUCCH resource (or PUCCH resource group).

Option 1 is related to methods 1-1a, 1-1b, 2-1a, and 2-1b which will be described later and Option 2 is related to methods 1-2a, 1-2b, 1-2c, 2-2a, 2-2b, and 2-2c which will be described later.

Regarding panel identification, there may be four alternatives Alt.1 to Alt4 as follows.

Alt.1: SRS resource set ID
Alt.2: ID directly linked to a reference RS resource and/or a reference RS resource set
Alt.3: ID that can be assigned to a target RS resource or a target RS resource set
Alt.4: ID additionally set in spatial relation info Option 1 is directly correlated with Alt.4, and PUCCH-SpatialRelationInfo is an RRC parameter including a reference RS resource and thus may be understood as a part of Alt.2.

Option 2 is related to Alt.3 in that the intention of option 2 is to identify a UE panel per target "PUCCH resource(s)" for transmission.

Alt.1 may be applied to option 1 and option 2 when an existing ID of Rel-15 is intended to be reused.

In terms of technical differences between option 1 and option 2, option 1 has a limitation that a maximum number of configurable reference RSs can be reduced by the number of activated UE Tx panels.

As an example, the same reference RS as shown in FIG. 13 (e.g., RS7) cannot be associated with multiple UE panels according to option 1 unless duplicate allocation for unless other PUCCH-SpatialRelationInfo values, for example, RS8 (=RS7) is used.

FIG. 13 is a diagram showing an example of association between a panel and a reference signal proposed in the present disclosure. The example shown in FIG. 13 is based on option 1. Specifically, referring to FIG. 13, when two Tx panels are activated in a UE, some PUCCH-SpatialRelationInfo values may be associated with UE panel 1 (Panel 1) and other PUCCH-SpatialRelationInfo values may be associated with UE panel 2 (Panel 2). This inevitably reduces a maximum number of configurable reference RSs in a list of PUCCH-SpatialRelationInfo values.

FIG. 14 is a diagram showing another example of association between a panel and a reference signal proposed in the present disclosure. The example shown in FIG. 14 is based on option 2.

Referring to FIG. 14, the same reference RS (e.g., RS7) may be associated with a plurality of UE panels through different PUCCH resources without affecting the maximum number of configurable reference RSs in the list of PUCCH-SpatialRelationInfo values. More specifically, RS7 is a DL RS and is associated with both PUCCH resources #9 and #125, and the resources are associated with different UE panels. At this time, the UE may transmit a PUCCH on PUCCH resource #125 having the corresponding beam and panel #1 used to receive RS7. In addition, the UE may transmit the PUCCH on PUCCH resource #9 having the corresponding beam and panel #2 used to receive the same RS7.

Referring to the examples of FIGS. 13 and 14, a panel related to panel-selective PUCCH transmission may be identified based on at least one of the following i) and ii).

i) "PUCCH-SpatialRelationInfo" related configuration (option 1)

ii) "PUCCH resource" related configuration (option 2)

Hereinafter, an operation method related to a method of configuring/indicating/identifying a panel according to i) "PUCCH-SpatialRelationInfo" related configuration (proposal 1-1) and an operation method related a method of configuring/indicating/identifying a panel according to ii) "PUCCH resource" related configuration (proposal 102) will be described in detail.

For convenience of description, proposals 1-1/1-2/1-3/1-4 are based on the example of "RS7" (hereinafter, "RS7") of FIGS. 13 and 14. That is, proposals 1-1/1-2/1-3/1-4 can be extended and applied to other RS(s) related to PUCCH transmission.

[Proposal 1-1]

Regarding the method of configuring/indicating/identifying a panel according to "PUCCH-SpatialRelationInfo" related configuration (option 1), a UE operation based on method 1-1a or method 1-1b below may be defined/configured/indicated.

[Method 1-1a]

When RS7 is associated with Panel #1 of a UE and RS7 is a downlink reference signal (e.g., a CSI-RS, a TRS and/or an SSB) and/or a downlink channel (e.g., CORESET), the UE may operate as follows.

The UE may perform corresponding UL transmission (e.g., PUCCH transmission) by applying/using/based on spatial-domain filter coefficients corresponding to specific spatial-domain filter coefficients applied/used/based when a corresponding DL RS/channel is received through Panel #1 (and/or specific Rx panel #1 associated with UE Tx panel #1) and/or a beam.

[Method 1-1b]

When RS7 is associated with Panel #1 of a UE and RS7 is an uplink reference signal (e.g., SRS) and/or an uplink channel (e.g., PRACH), the UE may operate as follows.

The UE may perform corresponding UL transmission (e.g., PUCCH transmission) by applying/using/based on spatial-domain filter coefficients corresponding to specific spatial-domain filter coefficients applied/used/based when a corresponding UL RS/channel is transmitted through Panel #1 (and/or specific Rx panel #1 associated with UE Tx panel #1) and/or a beam.

[Proposal 1-2]

Regarding the method of configuring/indicating/identifying a panel according to "PUCCH resource" related configuration (option 2), a UE operation based on method 1-2a, 1-2b, and 1-2c below may be defined/configured/indicated. The operation described below may be interpreted/applied as a generalization/extension proposal operation in a situation in which a specific RS is associated with specific PUCCH resource(s) and specific panel-related ID(s).

[Method 1-2a]

When RS7 is indicated/activated/down-selected through PUCCH spatialRelationInfo and/or MAC-CE signaling, RS7 is associated with PUCCH resource #125 related Panel #1 of the UE, and RS7 is a downlink reference signal (e.g., CSI-RS, TRS and/or SSB) and/or a downlink channel (e.g., CORESET), the UE may operate as follows.

The UE may perform corresponding UL transmission (e.g., PUCCH transmission) by applying/using/based on spatial-domain filter coefficients corresponding to specific spatial-domain filter coefficients applied/used/based when a corresponding DL RS/channel is received through Panel #1 (and/or specific Rx panel #1 associated with UE Tx panel #1) and/or a beam.

[Method 1-2b]

When RS7 is indicated/activated/down-selected through PUCCH spatialRelationInfo and/or MAC-CE signaling, RS7 is associated with PUCCH resource #9 related Panel #2 of the UE, and RS7 is a downlink reference signal (e.g., CSI-RS, TRS and/or SSB) and/or a downlink channel (e.g., CORESET), the UE may operate as follows.

The UE may perform corresponding UL transmission (e.g., PUCCH transmission) by applying/using/based on spatial-domain filter coefficients corresponding to specific spatial-domain filter coefficients applied/used/based when a corresponding DL RS/channel is received through Panel #2 (and/or specific Rx panel #2 associated with UE Tx panel #2) and/or a beam.

[Method 1-2c]

When RS7 is indicated/activated/down-selected through PUCCH spatialRelationInfo and/or MAC-CE signaling, RS7 is associated with PUCCH resource #125 related Panel #1 of the UE, and RS7 is an uplink reference signal (e.g., SRS) and/or an uplink channel (e.g., PRACH), the UE may operate as follows.

The UE may perform corresponding UL transmission (e.g., PUCCH transmission) by applying/using/based on spatial-domain filter coefficients corresponding to specific spatial-domain filter coefficients applied/used/based when a corresponding UL RS/channel is transmitted through Panel #1 (and/or specific Rx panel #1 associated with UE Tx panel #1) and/or a beam.

If there is another PUCCH resource #X associated with RS7, the UE may not expect that a UE Panel associated with the corresponding PUCCH resource is connected/configured/indicated differently from UE Panel #1. Specifically, if PUCCH resource #X is configured/indicated, the operation may be limited such that panel indication connected/associated with the corresponding PUCCH resource must be Panel #1. If a different configuration/instruction is provided, the UE may be configured to drop PUCCH transmission for PUCCH resources in which such (configuration) collision has occurred (that is, the UE may ignore the configuration/instruction).

A case in which there is another PUCCH resource #X to which RS7 is associated and a UE Panel associated with the PUCCH resource is connected/configured/indicated differently from UE Panel #1 (e.g., to UE Panel #2) is assumed. At this time, if the UE has performed effective transmission of RS7 using different panels before a specific time interval (e.g., T, T≥0 [time-domain unit]) from the corresponding time, the UE may operate as follows. The UE may be defined/configured/instructed to perform corresponding UL transmission (e.g., PUCCH transmission) by applying/using/based on specific Panel #n and beam information (e.g., spatial-domain filter coefficients) used in actual transmission.

For example, the UE may perform PUCCH transmission for PUCCH resource #125 by applying/using/based beam information (e.g., spatial-domain filter coefficients) applied to RS7 (e.g., SRS resource #7) transmitted through Panel #1. That is, the UE may perform PUCCH transmission corresponding to PUCCH resource #125 through Panel #1 (or using panel #1).

In addition, the UE may perform PUCCH transmission for PUCCH resource #9 by applying/using/based beam information (e.g., spatial-domain filter coefficients) applied to RS7 (e.g., SRS resource #7) transmitted through Panel #2. That is, the UE may perform PUCCH transmission corresponding to PUCCH resource #8 through Panel #2 (or using panel #2).

[Proposal 1-3]

An overriding operation for an operation based on at least one of the proposed operations (e.g., proposals 1/1-1/1-2 and methods 1-1a, 1-1b, 1-2a, 1-2b, 1-2c) may be defined. Hereinafter, specific examples will be described.

When a UE is defined/configured/instructed to transmit a PUCCH using a specific panel (UE Tx panel) (according to a specific panel-specific ID) during PUCCH transmission with respect to a specific a PUCCH resource, if the PUCCH is a specific type of PUCCH, such as a PUCCH for ACK/NACK transmission, particularly, the overriding operation may be performed as follows.

The UE may be defined/configured/instructed to transmit the corresponding PUCCH (for ACK/NACK transmission) using a panel (UE Tx panel) according to a specific panel ID (UE (Tx) panel ID) (or corresponding to the UE (TX) panel ID) associated with a specific control resource set (CORESET) that has caused the ACK/NACK transmission.

[Proposal 1-4]

In power control parameter(s) applied during PUCCH transmission for a specific PUCCH resource (associated with the aforementioned specific operations (e.g., proposals 1/1-1/1-2/1-3 and methods 1-1a, 1-1b, 1-2a, 1-2b, 1-2c), an operation related to the power control parameters may be considered.

According to the existing operation, power control parameter(s) additionally associated in advance with PUCCH-SpatialRelationInfo determined/selected/indicated (by RRC and/or MAC CE signaling) is applied for each PUCCH resource.

By improving the above operation, the power control parameter(s) may be configured/indicated in association with not only a parameter for beam indication (by PUCCH-SpatialRelationInfo) but also a panel-specific ID for indicating a specific panel. Accordingly, (joint) panel & beam-specific power control can be performed.

As an example, the present embodiment may be applied to the method according to the above proposal 1-2 (e.g., a method in which a panel is configured/indicated/identified according to "PUCCH resource" related configuration). In this case, specific power control parameter(s) for each combination of {UE panel ID, beam/spatial-related ID} may be configured/associated/indicated according to a specific joint encoding method (e.g., order pair form) using a specific UE panel ID and a specific beam/spatial related ID (e.g., PUCCH-SpatialRelationInfo) that are (directly) associated/configured/indicated to specific PUCCH resource(s).

At this time, the power control parameter(s) may include specific open-loop power control parameter(s) (open-loop PC parameter(s)) (e.g., P0, alpha, and/or DL RS for pathloss calculation, etc.), specific closed-loop power control parameter(s) (e.g., accumulative TPC related parameter) and/or an absolute power control related parameter (absolute TPC related parameter, etc.).

[Proposal 2]

Hereinafter, panel-selective SRS transmission will be described in detail.

The above-described proposed operations (e.g., proposals 1/1-1/1-2/1-3/1-4 and methods 1-1a, 1-1b, 1-2a, 1-2b, and 1-2c) assume that target uplink (UL) transmission is PUCCH transmission.

By similarly extending this, the proposals of the present disclosure may be applied even to transmission of a specific SRS (and/or a PUSCH), and specific details thereof may be as follows.

Referring to the examples of FIGS. 13 and 14, a panel related to panel-selective SRS transmission may be identified based on at least one of the following i) and ii).

i) "SRS-SpatialRelationInfo" related configuration (option 1)
  ii) "SRS resource" related configuration (option 2)

Hereinafter, an operation method related to a method of configuring/indicating/identifying a panel according to i) "SRS-SpatialRelationInfo" related configuration (proposal 2-1) and ii) an operation method related to a method of configuring/indicating/identifying a panel according to "SRS resource" related configuration (proposal 2-2) will be described in detail.

For convenience of description, proposals 2-1/2-2/2-3 are based on the example of "RS7" (hereinafter, "RS7") of FIGS. 13 and 14. That is, the proposals 2-1/2-2/2-3 can be extended and applied to other RS(s) related to SRS transmission.

As an example, in relation to SRS transmission, if spatial-relation-info for this is a UL RS/channel, specific PRACH transmission (and it is accompanied by a specific PRACH transmission (and a specific panel-specific ID associated therewith) may be defined/configured/indicated as such a reference UL RS/channel.

[Proposal 2-1]

In an operation of applying the method of configuring/indicating/identifying a panel according to "SRS-SpatialRelationInfo" related configuration" to the a "target SRS (and/or PUSCH)", a UE operation based on the following method 2-1a or 2-1b may be defined/configured/indicated.

[Method 2-1a]

If RS7 is associated with Panel #1 of the UE and RS7 is a downlink reference signal (e.g., CSI-RS, TRS and/or SSB) and/or a downlink channel (e.g., CORESET), the UE may operate as follows.

The UE may perform corresponding UL transmission (e.g., SRS, PUCCH and/or PUSCH transmission) by applying/using/based on spatial-domain filter coefficients corresponding to specific spatial-domain filter coefficients applied/used/based when a corresponding DL RS/channel is received through Panel #1 (and/or specific Rx panel #1 associated with UE Tx panel #1) and/or a beam.

[Method 2-1b]

If RS7 is associated with Panel #1 of the UE and RS7 is an uplink reference signal/channel (e.g., PRACH, and/or PRACH preamble/sequence), the UE may operate as follows.

The UE may perform corresponding UL transmission (e.g., SRS, PUCCH and/or PUSCH transmission) by applying/using/based on spatial-domain filter coefficients corresponding to specific spatial-domain filter coefficients applied/used/based when the corresponding UL RS/channel is received through Panel #1 (and/or specific Rx panel #1 associated with UE Tx panel #1) and/or a beam.

[Proposal 2-2]

In relation to the operation of applying the method of configuring/indicating/identifying a panel according to "SRS resource" related configuration to "target SRS (and/or PUSCH)", a UE operation based on the following methods 2-2a, 2-2b, and 2-2c may be defined/configured/indicated. For convenience, an example of a case of "RS7" and associated SRS-resources #9 & #125 will be described. In general, this operation may be interpreted/applied as a generalization/extension proposal operation in a situation in which a specific RS is associated with specific SRS resource(s) and specific panel-related ID(s).

[Method 2-2a]

RS7 is indicated/activated/down-selected through SRS spatialRelationInfo and/or MAC-CE signaling, RS7 is associated with SRS resource #125 associated with panel #1 of a UE, and RS7 is a downlink reference signal (e.g., CSI-RS, TRS and/or SSB) and/or a downlink channel (e.g., CORE-SET), the UE may operate as follows.

The UE may perform corresponding UL transmission (e.g., SRS transmission) by applying/using/based on spatial-domain filter coefficients corresponding to specific spatial-domain filter coefficients applied/used/based when the corresponding DL RS/channel is received through panel #1 (and/or specific Rx panel #1 associated with UE Tx panel #1) and/or a beam.

[Method 2-2b]

RS7 is indicated/activated/down-selected through SRS spatialRelationInfo and/or MAC-CE signaling, RS7 is associated with SRS resource #9 associated with panel #2 of a UE, and RS7 is a downlink reference signal (e.g., CSI-RS, TRS and/or SSB) and/or a downlink channel (e.g., CORE-SET), the UE may operate as follows.

The UE may perform corresponding UL transmission (e.g., SRS transmission) by applying/using/based on spatial-domain filter coefficients corresponding to specific spatial-domain filter coefficients applied/used/based when the corresponding DL RS/channel is received through panel #2 (and/or specific Rx panel #2 associated with UE Tx panel #2) and/or a beam.

[Method 2-2c]

RS7 is indicated/activated/down-selected through SRS spatialRelationInfo and/or MAC-CE signaling, RS7 is associated with SRS resource #125 associated with panel #1 of a UE, and RS7 is an uplink reference signal/channel (e.g., PRACH and/or PRACH preamble/sequence), the UE may operate as follows.

The UE may perform corresponding UL transmission (e.g., SRS transmission) by applying/using/based on spatial-domain filter coefficients corresponding to specific spatial-domain filter coefficients applied/used/based when the corresponding UL RS/channel is transmitted through panel #1 (and/or specific Rx panel #1 associated with UE Tx panel #1) and/or a beam.

If there is another SRS resource #X associated with RS7, the UE may not expect that a UE panel associated with the corresponding SRS resource is connected/configured/indicated differently from UE panel #1. Specifically, if SRS resource #X is configured/indicated, the operation may be limited such that panel indication connected/associated with the corresponding SRS resource must be panel #1. If a different configuration/instruction is provided, the UE may be configured to drop SRS transmission for SRS resources in which such (configuration) collision has occurred (that is, the UE may ignore the configuration/instruction).

A case in which there is another SRS resource #X to which RS7 is associated and a UE panel associated with the SRS resource is connected/configured/indicated differently from UE panel #1 (e.g., to UE panel #2) is assumed. At this time, if the UE has performed effective transmission of RS7 using different panels before a specific time interval (e.g., T, T [time-domain unit]) from the corresponding time, the UE may operate as follows. The UE may be defined/configured/instructed to perform different/independent corresponding UL transmission (e.g., SRS transmission) by applying/using/based on specific panel #n and beam information (e.g., spatial-domain filter coefficients) used in actual transmission.

For example, the UE may perform SRS transmission for SRS resource #125 by applying/using/based beam information (e.g., spatial-domain filter coefficients) applied to RS7 (e.g., SRS resource #7) transmitted through panel #1. That is, the UE may perform SRS transmission corresponding to SRS resource #125 through panel #1 (or using panel #1).

In addition, the UE may perform SRS transmission for SRS resource #9 by applying/using/based beam information (e.g., spatial-domain filter coefficients) applied to RS7 (e.g., SRS resource #7) transmitted through panel #2. That is, the UE may perform SRS transmission corresponding to SRS resource #8 through Panel #2 (or using panel #2).

[Proposal 2-3]

In power control parameter(s) applied during SRS transmission for a specific SRS resource (associated with the above-described specific operations (e.g., proposals 2/2-1/2-2/1-3 and methods 1-1a, 1-1b, 2-2a, 2-2b, and 2-2c)), an operation related to the power control parameters may be considered.

According to the existing operation, the power control parameter(s) additionally associated in advance with SRS-SpatialRelationInfo determined/selected/indicated for each SRS resource (by RRC and/or MAC CE signaling) are applied.

The above operation is basically applied, and the power control parameter(s) to be applied at this time may be configured/indicated in association with not only a parameter for beam indication (by SRS-SpatialRelationInfo) but also a panel-specific ID for indicating a specific panel. Accordingly, (joint) panel & beam-specific power control can be performed.

As an example, the present embodiment may be applied to the method according to proposal 2-2 (e.g., method of configuring/indicating/identifying a panel according to "SRS resource" related configuration). In this case, specific power control parameter(s) for each combination of {UE panel ID, beam/spatial-related ID} may be configured/associated/indicated according to a specific joint encoding method (e.g., order pair form) using a specific UE panel ID and a specific beam/spatial related ID (e.g., SRS-SpatialRelationInfo) that are (directly) associated/configured/indicated to specific SRS resource(s).

At this time, the power control parameter(s) may include specific open-loop power control parameter(s) (open-loop PC parameter(s)) (e.g., P0, alpha, and/or DL RS for pathloss calculation, etc.), specific closed-loop power control parameter(s) (e.g., accumulative TPC related parameter) and/or an absolute power control related parameter (absolute TPC related parameter, etc.).

In terms of implementation, operations of a base station/UE according to the above-described embodiments (e.g., operations related to uplink signal transmission based on at least one of proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c) may be processed by apparatuses of FIGS. 18 to 22 (e.g., processors 102 and 202 in FIG. 19) which will be described later.

Further, operations of a base station/UE according to the above-described embodiments (e.g., operations related to uplink signal transmission based on at least one of proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c) may be stored in a memory (e.g., 104 and 204 in FIG. 19) in the form of commands/program for driving at least one processor (e.g., 102 or 202 in FIG. 19).

Hereinafter, operations between a UE and a base station based on the above-described proposed methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c) will be described in detail with reference to FIG. 15.

FIG. 15 shows an example of signaling between a UE and a base station to which methods proposed in the present disclosure can be applied. FIG. 15 is only for convenience of description and does not limit the scope of the present disclosure. In addition, some step(s) shown in FIG. 15 may be omitted depending on circumstances and/or settings.

In FIG. 15, a case in which the UE and/or the BS support multi-panel transmission/reception is assumed. The UE/BS may correspond to any one of the above-described three multi-panel UE categories (MPUE categories). In addition, a panel described in FIG. 15 may be based on the definition of the panel described above.

Hereinafter, the operation of the UE will be described.

The UE may report UE capability information to the BS (S1510). The UE capability information may include UE capability information related to panels. For example, the UE capability information may include the number of panels (groups) that can be supported by the UE, information on whether multi-panel-based simultaneous transmission can be performed, information on a multi-panel category, and the like. In this regard, the UE may report UE capability information related to the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c) to the BS.

The UE may receive a panel-related configuration from the BS (S1520). For example, the configuration may include panel-related information for UL transmission of the UE (e.g., refer to panel-specific transmission/reception related configuration/indication). As a specific example, the panel-related configuration may be a configuration for UL transmission such as transmission of a PUCCH, a PUSCH, an SRS, and a PRACH. In particular, with respect to PUCCH transmission, a panel for panel-specific transmission may be identified by PUCCH-SpatialRelationInfo and/or PUCCH-resource.

In this regard, the UE may receive a configuration related to the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c) from the BS. For example, as in the above-described methods, the panel-related configuration may include a configuration for PUCCH-SpatialRelationInfo/PUCCH resource related to the panel and/or a configuration for SRS-SpatialRelationInfo/SRS resource related to the panel.

The configuration may be set in the form of an existing information element (IE) and/or an existing field (e.g., SRS resource indicator (SRI), etc.), or a newly defined IE and/or a newly defined field. The configuration may be transmitted through higher layer signaling (e.g., RRC message or MAC-CE).

The UE may perform beam management with the BS for each panel based on the configuration (S1530). As an example, the UE may perform beam training on one or more panels included in the configuration and may report information determined or calculated through the beam training to the BS. In addition, the beam management (e.g., DL/UL beam management) step may include a procedure for indicating and/or configuring a panel for UL transmission. As an example, when DL/UL beam management is performed, a panel for UL transmission is indicated and/or configured (e.g., via MAC-CE), and UL transmission is triggered (e.g., via DCI), the procedure for indicating and/or configuring the panel for UL transmission may be considered to be included in step S1530. Further, step S1530 may be omitted depending on whether or not beam management needs to be performed. In this regard, in performing the beam management procedure, the UE may apply the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c).

The UE may receive information (e.g., indication) for scheduling UL transmission from the BS (S1540). The corresponding indication may be performed through MAC-CE and/or DCI. For example, the corresponding indication may include panel-related indication information (e.g., refer to panel-specific transmission/reception related configuration/indication). As an example, when beam management (e.g., DL/UL beam management) is performed to indicate and/or configure a panel for UL transmission, and UL transmission is triggered, indication and/or configuration of the panel for UL transmission may be performed simultaneously with triggering of UL transmission. In this case, the procedure for indicating and/or configuring the panel for UL transmission may be considered to be included in step S1540 (e.g., UL DCI may include a panel ID). In addition, in the case of UL transmission requiring UL DCI, such as PUSCH transmission, the corresponding step may be essential (however, except for a configured grant PUSCH), but step S1540 may be omitted in the case of a PUCCH, SRS (however, except for an aperiodic SRS), and the like.

In this regard, the UE may receive indication related to the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c) from the BS. For example, the indication may include an indication with respect to PUCCH-SpatialRelationInfo/PUCCH resource related to the panel and/or an indication with respect to SRS-SpatialRelationInfo/SRS resource related to the panel.

The UE may perform UL transmission to the BS using the panel based on the configuration and/or the indication (S1550). For example, the UE may perform UL transmission using one panel or multiple panels according to the multi-panel UE category. In this regard, the UE may perform UL transmission (e.g., transmission of PUCCH, PUSCH, SRS, or PRACH) to the BS as in the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c).

Hereinafter, the operation of the BS will be described.

The BS may receive a report on UE capability information from the UE (S1510). The UE capability information may include UE capability information related to panels. As an example, the UE capability information may include the number of panels (groups) that can be supported by the UE, information on whether multi-panel-based simultaneous transmission can be performed, information on a multi-panel UE category, and the like. In this regard, the BS may receive the report on the UE capability information related the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c) from the UE.

The BS may transmit a panel related configuration to the UE (S1520). For example, the configuration may include panel-related information for UL transmission of the UE (e.g., refer to panel-specific transmission/reception related configuration/indication). As a specific example, the panel-related configuration may be a configuration for UL transmission such as transmission of a PUCCH, a PUSCH, an SRS, and a PRACH. In particular, with respect to PUCCH transmission, a panel for panel-specific transmission may be identified by PUCCH-SpatialRelationInfo and/or PUCCH-resource.

In this regard, the UE may receive a configuration related to the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c) from the BS. For example, as in the above-described methods, the panel-related configuration may include a configuration for PUCCH-SpatialRelationInfo/PUCCH resource related to the panel and/or a configuration for SRS-SpatialRelationInfo/SRS resource related to the panel.

The configuration may be set in the form of an existing information element (IE) and/or an existing field (e.g., SRS resource indicator (SRI), etc.), or a newly defined IE and/or a newly defined field. The configuration may be transmitted through higher layer signaling (e.g., RRC message or MAC-CE).

The BS may perform beam management with the UE for each panel based on the configuration (S1530). As an example, the UE may perform beam training on one or more panels included in the configuration and may report information determined or calculated through the beam training to the BS. In addition, the beam management (e.g., DL/UL beam management) step may include a procedure for indicating and/or configuring a panel for UL transmission. As an example, when DL/UL beam management is performed, a panel for UL transmission is indicated and/or configured (e.g., via MAC-CE), and UL transmission is triggered (e.g., via DCI), the procedure for indicating and/or configuring the panel for UL transmission may be considered to be included in step S1530. Further, step S1530 may be omitted depending on whether or not beam management needs to be performed. In this regard, in performing the beam management procedure, the BS may apply the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c).

The BS may transmit information (e.g., indication) for scheduling UL transmission to the UE (S1540). The corresponding indication may be performed through MAC-CE and/or DCI. For example, the corresponding indication may include panel-related indication information (e.g., refer to panel-specific transmission/reception related configuration/indication). As an example, when beam management (e.g., DL/UL beam management) is performed to indicate and/or configure a panel for UL transmission, and UL transmission is triggered, indication and/or configuration of the panel for UL transmission may be performed simultaneously with triggering of UL transmission. In this case, the procedure for indicating and/or configuring the panel for UL transmission may be considered to be included in step S1540 (e.g., UL DCI may include a panel ID). In addition, in the case of UL transmission requiring UL DCI, such as PUSCH transmission, the corresponding step may be essential (however, except for a configured grant PUSCH), but step S1540 may be omitted in the case of a PUCCH, SRS (however, except for an aperiodic SRS), and the like.

In this regard, the BS may transmit indication related to the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c) to the UE. For example, the indication may include an indication with respect to PUCCH-SpatialRelationInfo/PUCCH resource related to the panel and/or an indication with respect to SRS-SpatialRelationInfo/SRS resource related to the panel.

The BS may receive UL transmission from the UE using the panel based on the configuration and/or the indication (S1550). For example, the UE may perform UL transmission using one panel or multiple panels according to the multi-panel UE category. In this regard, the BS may receive UL transmission (e.g., transmission of PUCCH, PUSCH, SRS, or PRACH) from the UE as in the above-described methods (e.g., proposals 1/1-1/1-2/1-3/1-4, methods 1-1a, 1-1b, 1-2a, 1-2b, and 1-2c, proposals 2/2-1/2-2/2-3, and methods 2-1a, 2-1b, 2-2a, 2-2b, and 2-2c).

In addition, the above-described BS operation and/or UE operation (e.g., proposals 1/1-1/1-2/1-3/1-4, methods 1-1a, 1-1b, 1-2a), 1-2b, and 1-2c, proposals 2/2-1/2-2/2-3, and methods 2-1a, 2-1b, 2-2a, 2-2b, and 2-2c) may be implemented by apparatuses which will be described later (e.g., FIGS. 18 to 22).

Hereinafter, the above-described embodiments will be described in detail with reference to FIG. 16 in terms of the operation of the UE. Methods which will be described below are only divided for convenience of description, and some components of one method may be substituted with some components of another method or may be applied in combination therewith.

FIG. 16 is a flowchart showing a method for transmitting an uplink signal by a UE according to an embodiment of the present disclosure.

Referring to FIG. 16, a method for transmitting an uplink signal by a UE according to an embodiment of the present disclosure includes a configuration information reception step S1610 related to transmission of an uplink signal, a message reception step S1620 of scheduling transmission of the uplink signal, and an uplink signal transmission step S1630.

In S1610, the UE receives configuration information related to transmission of the uplink signal from a BS. The configuration information may be based on an RRC message.

According to an embodiment, the configuration information may include spatial related information related to transmission of the uplink signal, which will be described later. For example, the configuration information may include PUCCH-spatialRelationInfo or SRS-spatialRelationInfo.

The operation of receiving, by the UE (100/200 in FIGS. 18 to 22), the configuration information related to transmission of the uplink signal from the BS (100/200 in FIGS. 18 to 22) in S1610 may be implemented by apparatuses shown in FIGS. 18 to 22. For example, referring to FIG. 19, one or more processors 102 may control one or more transceivers 106 and/or one or more memories 104 to receive the configuration information related to transmission of the uplink signal from the BS 200.

In S1620, the UE receives a message for scheduling transmission of the uplink signal from the BS. The message may be based on a multiple access control-control element (MAC-CE) message or downlink control information (DCI).

According to an embodiment, the message may include information related to determination of a specific panel, which will be described later. The message may include information on a resource in which transmission of the uplink signal is scheduled. The message may include information related to activation of spatial related information related to transmission of the uplink signal.

The operation of receiving, by the UE (100/200 in FIGS. 18 to 22), the message for scheduling transmission of the uplink signal from the BS (100/200 in FIGS. 18 to 22) in step S1620 may be implemented by the apparatuses of FIGS. 18 to 22. For example, referring to FIG. 19, the one or more processors 102 may control one or more transceivers 106 and/or one or more memories 104 to receive the message for scheduling transmission of the uplink signal from the BS 200.

In S1630, the UE transmits the uplink signal to the BS.

According to an embodiment, the uplink signal may be transmitted based on beam information related to a specific panel. The beam information may be based on a spatial domain filter coefficient. The present embodiment may be based on proposal 1 or proposal 2.

The specific panel may be determined based on at least one of spatial related information related to transmission of the uplink signal or a resource in which transmission of the uplink signal is scheduled.

According to an embodiment, the resource in which transmission of the uplink signal is scheduled may be based on at least one of a plurality of resources associated with a preset panel. Based on that the specific panel is different from the preset panel, transmission of the uplink signal may be i) dropped or ii) performed based on a previously used panel. The present may be based on method 1-2c or method 2-2c.

As a specific example in which the operation based on i) or ii) is applied, the resource in which transmission of the uplink signal is scheduled is associated with panel #1 (a preset panel), but the message may include information (e.g., the ID of panel #2 or activation of a reference signal associated with panel #2) related to panel #2 (specific panel).

The previously used panel may be based on a panel used to transmit a specific reference signal within a specific time interval from the time at which the message is received. The specific reference signal may be based on an uplink reference signal (UL RS).

The specific reference signal may be based on spatial related information related to the resource in which transmission of the uplink signal is scheduled. Hereinafter, it will be described in detail with reference to FIG. 14. For example, if the resource in which transmission of the uplink signal is scheduled is PUCCH resource #9, the specific reference signal may be based on RS7 associated with PUCCH resource #9. RS7 may be based on spatial related information PUCCH-SpatialRelationInfo included in the configuration information.

According to an embodiment, based on the uplink signal being a specific type of physical uplink control channel (PUCCH), the uplink signal may be transmitted based on a panel related to a specific control resource set (CORESET). The present embodiment may be based on proposals 1-3. In this case, a Hybrid Automatic Repeat Request (HARQ) response may be transmitted through the specific type of PUCCH, and the specific control resource set may be related to the HARQ response.

According to an embodiment, the uplink signal may be transmitted based on a specific power control parameter. The specific power control parameter may be determined based on the specific panel. The present embodiment may be based on proposal 1-4 or proposal 2-3. Specifically, the specific power control parameter may be determined based on a combination of an ID related to the spatial related information and an ID related to the specific panel.

According to one embodiment, the uplink signal may be based on any one of a physical uplink control channel (PUCCH), a physical uplink shared channel (PUSCH), a physical random access channel (PRACH) or a sounding reference signal (SRS).

The spatial related information may be related to a downlink reference signal (DL RS) or an uplink reference signal (UL RS). Specifically, the downlink reference signal may be based on a channel state information-reference signal (CSI-RS), a tracking reference signal (TRS), or an SS block (SSB). The uplink reference signal may be based on a sounding reference signal (SRS) or a physical random access channel (PRACH).

The operation of transmitting, by the UE (100/200 in FIGS. 18 to 22), the uplink signal to the BS (100/200 in FIGS. 18 to 22) in step S1630 may be implemented by the apparatuses shown in FIGS. 18 to 22. For example, referring to FIG. 19, one or more processors 102 may control one or more transceivers 106 and/or one or more memories 104 to transmit the uplink signal to the BS 200.

Hereinafter, the above-described embodiments will be described in detail with reference to FIG. 17 in terms of the operation of the BS. Methods which will be described below are only divided for convenience of description, and some components of one method may be substituted with some components of another method or may be applied in combination therewith.

FIG. 17 is a flowchart illustrating a method for receiving an uplink signal by a BS according to another embodiment of the present disclosure.

Referring to FIG. 17, the method for receiving an uplink signal by a BS according to another embodiment of the present disclosure may include a configuration information transmission step S1710 related to transmission of an uplink signal, a message transmission step S1720 of scheduling transmission of the uplink signal, and an uplink signal reception step S1730.

In S1710, the BS transmits configuration information related to transmission of an uplink signal to a UE. The configuration information may be based on an RRC message.

According to an embodiment, the configuration information may include spatial related information related to transmission of the uplink signal, which will be described later. For example, the configuration information may include PUCCH-spatialRelationInfo or SRS-spatialRelationInfo.

The operation of transmitting, by the BS (100/200 in FIGS. 18 to 22), the configuration information related to transmission of the uplink signal to the UE (100/200 in FIGS. 18 to 22) in step S1710 may be implemented by apparatuses of FIGS. 18 to 22. For example, referring to FIG. 19, one or more processors 202 may control one or more transceivers 206 and/or one or more memories 204 to transmit the configuration information related to transmission of the uplink signal to the UE 100.

S1720, the BS transmits a message for scheduling transmission of the uplink signal to the UE. The message may be based on a multiple access control-control element (MAC-CE) message or downlink control information (DCI).

According to an embodiment, the message may include information related to determination of a specific panel, which will be described later. The message may include information on a resource in which transmission of the uplink signal is scheduled. The message may include information related to activation of spatial related information related to transmission of the uplink signal.

The operation of transmitting, by the BS (100/200 in FIGS. 18 to 22), the message for scheduling transmission of the uplink signal to the UE (100/200 in FIGS. 18 to 22) in step S1720 may be implemented by the apparatuses of FIGS. 18 to 22. For example, referring to FIG. 19, one or more processors 202 may control one or more transceivers 206 and/or one or more memories 204 to transmit the message for scheduling transmission of the uplink signal to the UE 100.

In S1730, the BS receives the uplink signal from the UE.

According to an embodiment, the uplink signal may be transmitted based on beam information related to a specific panel. The beam information may be based on a spatial domain filter coefficient. The present embodiment may be based on proposal 1 or proposal 2.

The specific panel may be determined based on at least one of spatial related information related to transmission of the uplink signal or a resource in which transmission of the uplink signal is scheduled.

According to an embodiment, the resource in which transmission of the uplink signal is scheduled may be based on at least one of a plurality of resources associated with a preset panel. Based on the fact that the specific panel is different from the preset panel, transmission of the uplink signal may be i) dropped or ii) performed based on a previously used panel. The present may be based on method 1-2c or method 2-2c.

As a specific example in which the operation based on i) or ii) is applied, the resource in which transmission of the uplink signal is scheduled is associated with panel #1 (a preset panel), but the message may include information (e.g., the ID of panel #2 or activation of a reference signal associated with panel #2) related to panel #2 (specific panel).

The previously used panel may be based on a panel used to transmit a specific reference signal within a specific time interval from the time at which the message is received. The specific reference signal may be based on an uplink reference signal (UL RS).

The specific reference signal may be based on spatial related information related to the resource in which transmission of the uplink signal is scheduled. Hereinafter, it will be described in detail with reference to FIG. 14. For example, if the resource in which transmission of the uplink signal is scheduled is PUCCH resource #9, the specific reference signal may be based on RS7 associated with PUCCH resource #9. RS7 may be based on spatial related information PUCCH-SpatialRelationInfo included in the configuration information.

According to an embodiment, based on the uplink signal being a specific type of physical uplink control channel (PUCCH), the uplink signal may be transmitted based on a panel related to a specific control resource set (CORESET). The present embodiment may be based on proposals 1-3. In this case, a Hybrid Automatic Repeat Request (HARQ) response may be transmitted through the specific type of PUCCH, and the specific control resource set may be related to the HARQ response.

According to an embodiment, the uplink signal may be transmitted based on a specific power control parameter. The specific power control parameter may be determined based on the specific panel. The present embodiment may be based on proposal 1-4 or proposal 2-3. Specifically, the specific power control parameter may be determined based on a combination of an ID related to the spatial related information and an ID related to the specific panel.

According to one embodiment, the uplink signal may be based on any one of a physical uplink control channel (PUCCH), a physical uplink shared channel (PUSCH), a physical random access channel (PRACH) or a sounding reference signal (SRS).

The spatial related information may be related to a downlink reference signal (DL RS) or an uplink reference signal (UL RS). Specifically, the downlink reference signal may be based on a channel state information-reference signal (CSI-RS), a tracking reference signal (TRS), or an SS block (SSB). The uplink reference signal may be based on a sounding reference signal (SRS) or a physical random access channel (PRACH).

The operation of receiving the uplink signal, by the BS (100/200 in FIGS. 18 to 22), from the UE (100/200 in FIGS. 18 to 22) in step S1730 may be implemented by the apparatuses shown in FIGS. 18 to 22. For example, referring to FIG. 19, one or more processors 202 may control one or more transceivers 206 and/or one or more memories 204 to receive the uplink signal from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 18 illustrates a communication system 1 applied to the present disclosure.

Referring to FIG. 18, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the B S s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 20 illustrates a signal process circuit for a transmission signal.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 21 illustrates another example of a wireless device applied to the present disclosure.

The wireless device may be implemented in various forms according to a use-case/service (refer to FIG. 18). Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 22 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Hereinafter, the advantages of the method for transmitting/receiving an uplink signal and the apparatus therefor in a wireless communication system according to an embodiment of the present disclosure will be described.

According to an embodiment of the present disclosure, an uplink signal is transmitted based on beam information related to a specific panel, and the specific panel is determined based on at least one of spatial related information related to transmission of the uplink signal or a resource in which transmission of the uplink signal is scheduled. Accordingly, transmission of the uplink signal can be panel-specifically performed.

In addition, when the specific panel is determined based on the spatial related information and the resource in which transmission of the uplink signal is scheduled, spatial related information (i.e., a maximum number of configurable reference RSs) that can be configured in a UE is not limited to the number of activated panels (e.g., Tx panels) of the UE. Accordingly, flexibility with respect to scheduling of panel-specific uplink signal transmission can be improved.

According to an embodiment of the present disclosure, the resource in which transmission of the uplink signal is scheduled is based on at least one of a plurality of resources associated with a preset panel, and the specific panel is different from the preset panel. Based on this, transmission of the uplink signal is i) dropped or ii) performed based on a previously used panel. Therefore, when panel-related indications collide, ambiguity of UE operation is removed and thus transmission of the uplink signal can be effectively performed and reliability of uplink signal transmission can be secured by utilizing a previously used panel under specific conditions.

According to an embodiment of the present disclosure, based on the fact that the uplink signal is a specific type of physical uplink control channel (PUCCH), the uplink signal can be transmitted based on a panel related to a specific control resource set (CORESET). A Hybrid Automatic Repeat Request response (HARQ response) can be transmitted through the specific type of PUCCH, and the specific control resource set can be related to the HARQ response. By setting an overriding operation under certain conditions as described above, the efficiency of panel-specific uplink signal transmission can be improved.

According to an embodiment of the present disclosure, the uplink signal can be transmitted based on a specific power control parameter, and the specific power control parameter can be determined based on the specific panel. Specifically, the specific power control parameter can be determined based on a combination of an ID related to the spatial related information and an ID related to the specific panel. Power control is performed beam-and-panel-specifically. Accordingly, it is possible to effectively support operations or characteristics of multi-panel UEs based on various implementation methods in transmitting a panel-specific uplink signal.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for transmitting an uplink signal by a terminal in a wireless communication system, comprising:
receiving configuration information related to transmission of an uplink signal;
receiving a message for scheduling transmission of the uplink signal; and
transmitting the uplink signal,
wherein the uplink signal is transmitted based on beam information related to a specific panel,
wherein the specific panel is determined based on at least one of i) spatial related information related to transmission of the uplink signal or ii) a resource in which transmission of the uplink signal is scheduled,
wherein the resource in which transmission of the uplink signal is scheduled is based on at least one of a plurality of resources associated with a preset panel, wherein, based on that the specific panel is different from the preset panel, the transmission of the uplink signal, the transmission of the uplink signal is i) dropped or ii) performed based on a previously used panel, wherein the uplink signal is transmitted based on a specific power control parameter, wherein the specific power control parameter is determined based on the specific panel, and wherein the specific power control parameter is determined based on a combination of i) an ID related to the spatial related information and ii) an ID related to the specific panel.

2. The method of claim 1, wherein the previously used panel is based on a panel used to transmit a specific reference signal within a specific time interval from a time at which the message is received.

3. The method of claim 2, wherein the specific reference signal is based on spatial related information related to the resource in which transmission of the uplink signal is scheduled.

4. The method of claim 1, wherein the configuration information includes the spatial related information, and the message includes information on the resource in which transmission of the uplink signal is scheduled.

5. The method of claim 1, wherein the uplink signal is transmitted based on a panel related to a specific control resource set (CORESET), based on that the uplink signal is related to a physical uplink control channel (PUCCH) of a specific type.

6. The method of claim 5, wherein a hybrid automatic repeat request (HARQ) response is transmitted through the PUCCH of the specific type, and the specific control resource set is related to the HARQ response.

7. The method of claim 1, wherein the uplink signal is based on any one of a physical uplink control channel (PUCCH), a physical uplink shared channel, a physical random access channel (PRACH) and a sounding reference signal (SRS).

8. The method of claim 7, wherein the spatial related information is related to a downlink reference signal (DL RS) or an uplink reference signal (UL RS).

9. A terminal for transmitting an uplink signal in a wireless communication system, comprising:
one or more transceivers;
one or more processors configured to control the one or more transceivers; and
one or more memories operably connectable to the one or more processors and storing instructions that, when executed by the one or more processors, configure the one or more processors to perform operations,
wherein the operations include:
receiving configuration information related to transmission of an uplink signal;
receiving a message for scheduling transmission of the uplink signal; and
transmitting the uplink signal,
wherein the uplink signal is transmitted based on beam information related to a specific panel,
wherein the specific panel is determined based on at least one of i) spatial related information related to transmission of the uplink signal or ii) a resource in which transmission of the uplink signal is scheduled,
wherein the resource in which transmission of the uplink signal is scheduled is based on at least one of a plurality of resources associated with a preset panel,
wherein, based on that the specific panel is different from the preset panel, the transmission of the uplink signal, the transmission of the uplink signal is i) dropped or ii) performed based on a previously used panel,
wherein the uplink signal is transmitted based on a specific power control parameter,
wherein the specific power control parameter is determined based on the specific panel, and
wherein the specific power control parameter is determined based on a combination of i) an ID related to the spatial related information and ii) an ID related to the specific panel.

10. A base station for receiving an uplink signal in a wireless communication system, comprising:
one or more transceivers;
one or more processors configured to control the one or more transceivers; and
one or more memories operably connectable to the one or more processors and storing instructions that, when executed by the one or more processors, configure the one or more processors to perform operations,
wherein the operations include:
transmitting configuration information related to transmission of an uplink signal;
transmitting a message for scheduling transmission of the uplink signal; and
receiving the uplink signal,
wherein the uplink signal is transmitted based on beam information related to a specific panel,
wherein the specific panel is determined based on at least one of i) spatial related information related to transmission of the uplink signal or ii) a resource in which transmission of the uplink signal is scheduled,
wherein the resource in which transmission of the uplink signal is scheduled is based on at least one of a plurality of resources associated with a preset panel,
wherein, based on that the specific panel is different from the preset panel, the transmission of the uplink signal, the transmission of the uplink signal is i) dropped or ii) performed based on a previously used panel,
wherein the uplink signal is transmitted based on a specific power control parameter,
wherein the specific power control parameter is determined based on the specific panel, and
wherein the specific power control parameter is determined based on a combination of i) an ID related to the spatial related information and ii) an ID related to the specific panel.

* * * * *